US008750435B2

(12) United States Patent
Yokokawa et al.

(10) Patent No.: US 8,750,435 B2
(45) Date of Patent: Jun. 10, 2014

(54) RECEIVING APPARATUS, RECEIVING METHOD, AND RECEIVING SYSTEM

(75) Inventors: Takashi Yokokawa, Kanagawa (JP); Hitoshi Sakai, Kanagawa (JP); Taylor Matthew, Hampshire (GB)

(73) Assignee: Sony Corporation, Tokyo (JP)

( * ) Notice: Subject to any disclaimer, the term of this patent is extended or adjusted under 35 U.S.C. 154(b) by 202 days.

(21) Appl. No.: 13/165,230

(22) Filed: Jun. 21, 2011

(65) Prior Publication Data

US 2011/0317790 A1 Dec. 29, 2011

(30) Foreign Application Priority Data

Jun. 28, 2010 (JP) ................................. 2010-145804

(51) Int. Cl.
*H04L 27/06* (2006.01)

(52) U.S. Cl.
USPC ........... 375/342; 375/260; 375/347; 375/350; 375/351

(58) Field of Classification Search
CPC .............. H04L 5/0048; H04L 25/0216; H04L 27/2662; H04L 25/0232
USPC .................. 375/260, 324, 347, 342, 350, 351
See application file for complete search history.

(56) References Cited

U.S. PATENT DOCUMENTS 7,664,189 B2 * 2/2010 Kawauchi ..................... 375/260
8,045,945 B2 * 10/2011 Kawauchi et al. ............ 455/296
8,077,781 B2 * 12/2011 Ido ............................... 375/260
8,175,204 B2 * 5/2012 Kawauchi et al. ............ 375/350
2004/0181800 A1 * 9/2004 Rakib et al. ..................... 725/25
2007/0177685 A1 * 8/2007 Kawauchi ..................... 375/260
2009/0059887 A1 * 3/2009 Pekonen et al. ............... 370/345
2009/0110127 A1 * 4/2009 Kawauchi et al. ............ 375/344
2011/0158334 A1 * 6/2011 Arambepola et al. ........ 375/260

FOREIGN PATENT DOCUMENTS

JP   2005-312027      11/2005
JP   2010-141907 A     6/2010
WO   2009-134061      11/2009

OTHER PUBLICATIONS

U.S. Appl. No. 13/983,781, filed Aug. 6, 2013, Yokokawa, et al.
Office Action issued on Apr. 1, 2014 in related Japanese Patent Application No. 2010-145804 and its English translation.

* cited by examiner

*Primary Examiner* — Sophia Vlahos
(74) *Attorney, Agent, or Firm* — Oblon, Spivak, McClelland, Maier & Neustadt, L.L.P.

(57) ABSTRACT

A receiving apparatus includes: a transmission path characteristics estimating section obtaining pre-interpolation transmission path characteristic data as estimate values for transmission path characteristics as characteristics of a transmission path of an OFDM signal for transmission symbols of pilot signals by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal; a distortion correcting section performing distortion correction for the OFDM signal by using the transmission path characteristic data; and a filter controlling section controlling a pass band of the interpolation filter.

10 Claims, 22 Drawing Sheets

RECEIVING APPARATUS, RECEIVING METHOD, AND RECEIVING SYSTEM

BACKGROUND

The present disclosure relates to a receiving apparatus, a receiving method, and a receiving system. More particularly, the disclosure relates to a receiving apparatus, a receiving method, and a receiving system each of which is capable of preventing deterioration of estimate precision of transmission path characteristics as characteristics of a transmission path for an OFDM signal.

The terrestrial digital broadcasting or the like adopts an Orthogonal Frequency Division Multiplexing (OFDM) system as a modulation system for modulating data (signal).

In the OFDM system, digital modulation such as Phase Shift Keying (PSK) or Quadrature Amplitude Modulation (QAM) is carried out. In such a digital modulation, a large number of orthogonal sub-carriers are provided within a transmission band, and predetermined pieces of data are allocated to amplitudes and phases of the sub-carriers, respectively.

In the OFDM system, since the transmission band is divided with a large number of sub-carriers, the band per one (one wave) sub-carrier becomes narrow, and thus a modulation rate becomes low. However, an overall transmission rate (of the entire sub-carriers) is not changed from that in the case of a modulation system in the related art.

As has been described, since in the OFDM system, the predetermined pieces of data are allocated to plural sub-carriers, respectively, the modulation can be carried out by using an Inverse Fast Fourier Transfer (IFFT) arithmetic operation for carrying out inverse Fourier transfer. In addition, the demodulation of the OFDM signal obtained through the modulation can be carried out by using a Fast Fourier Transfer (FFT) arithmetic operation for carrying out Fourier transform.

Therefore, a transmitting apparatus which transmits the OFDM signal can be configured by using a circuit for carrying out the IFFT arithmetic operation. Also, a transmitting apparatus which receives the OFDM signal can be configured by using a circuit for carrying out the FFT arithmetic operation.

In addition, in the OFDM system, provision of signal intervals called guard intervals which will be described later makes it possible to enhance the resistance against a multi-path. In addition, in the OFDM system, pilot signals as known signals (signals known on the receiving apparatus side) are discretely inserted into a time direction or a frequency direction. The receiving apparatus utilizes the pilot signals in synchronization, and estimation of the transmission path characteristics.

The OFDM system is adopted in the terrestrial digital broadcasting or the like on which an influence of multi-path interference is strongly exerted because the OFDM system has the strong resistance against the multi-path. Digital Video Broadcasting-Terrestrial (DVB-T), Integrated Services Digital Broadcasting-Terrestrial (ISDB-T), and the like, for example, are known as the standards for the terrestrial digital broadcasting adopting the OFDM system.

In the OFDM system, the data is transmitted in units called OFDM symbols.

FIG. 1 is a diagram showing the OFDM symbols.

The OFDM symbol is composed of an effective symbol and a guard interval. In this case, the effective symbol is a signal period of time for which the IFFT is carried out in a phase of the modulation. Also, in the guard interval, a waveform of a part of the second half of the effective symbol is copied in a head of the effective symbol as it is.

When let Tu sec. to be a length of the effective symbol of the OFDM symbol, that is, a length of the effective symbol as a length not containing therein the guard interval, and let Fc Hz to be an interval between the sub-carriers of the OFDM, a relationship of Fc=1/Tu holds.

In the OFDM system, as shown in FIG. 1, the guard interval is provided in the head of the OFDM symbol, thereby enhancing the resistance against the multi-path.

In the terrestrial digital broadcasting, a unit called an OFDM transmission frame is defined, and the OFDM transmission frame is composed of plural OFDM symbols.

For example, in the ISDB-T standard, one OFDM transmission frame is composed of 204 OFDM symbols. Also, a position where the pilot signal is inserted is previously determined with the OFDM transmission frame as a unit.

In the OFDM system in which the modulation of the QAM system is used in the modulation of the sub-carriers, in a phase of the transmission, an influence which differs every sub-carrier is exerted on the amplitude and phase of the sub-carrier of the OFDM signal obtained by subjecting the data to the OFDM by the multi-path or the like.

For this reason, the receiving apparatus carries out distortion correction for equalizing the OFDM signal received from the transmitting apparatus in such a way that an amplitude and a phase of a sub-carrier of the OFDM signal received from the transmitting apparatus become equal to an amplitude and a phase of the sub-carrier of the OFDM signal transmitted from the transmitting apparatus, respectively.

That is to say, in the OFDM system, the transmitting apparatus discretely inserts (the transmission symbols of) the known pilot signals whose amplitudes and phases are previously determined as the transmission symbols (sub-carriers) composing the OFDM symbols, respectively. Also, the receiving apparatus estimates the transmission path characteristics as the characteristics (frequency characteristics) of the transmission path in accordance with the amplitudes and phases of the pilot signals, and carries out the distortion correction for the OFDM signal by using the transmission path characteristic data representing the transmission path characteristics thus estimated.

FIG. 2 is a diagram showing an example of an arrangement pattern of (the transmission symbols of) the pilot signals within the OFDM symbols.

It is noted that in FIG. 2 (to which FIGS. 5, 6, 14, and 15 as will be described later are also similar), an axis of abscissa represents a sub-carrier number based on which the sub-carrier of the OFDM signal is specified, and an axis of ordinate represents an OFDM symbol number based on which the OFDM symbol of the OFDM signal is specified.

The sub-carrier number corresponds to a frequency, and the OFDM symbol number corresponds to time.

In FIG. 2, each of circle marks (an open circle mark and a black circle mark) represents either the sub-carrier of the OFDM signal, or a transmission symbol (a symbol on IQ constellation as data for modulation of the sub-carrier on a transmitting apparatus side) composing an OFDM symbol.

In addition, in FIG. 2, the black circle mark represents a transmission symbol of the pilot signal.

In FIG. 2, the transmission symbols of the pilot signals are arranged in plural positions previously determined, respectively, in the OFDM signal.

That is to say, in FIG. 2, (the transmission symbol of) the pilot signal is arranged every four OFDM symbols (OFDM symbol numbers) in the time direction. Also, (the transmission symbol of) the pilot signal is arranged every twelve sub-carriers (sub-carrier numbers) in the frequency direction.

With regard to the pilot signal, there are a pilot signal called a Scattered Pilot (SP) and a pilot signal called a Continual Pilot (CP).

The SP is periodically arranged every predetermined number of sub-carriers (transmission symbols), and is used to estimate the transmission characteristics. The CPs are arranged in the sub-carriers having the same frequency (a frequency previously determined), respectively.

FIG. 2 shows an example of the arrangement pattern of the SPs.

In the DVB-T and the ISDB-T, the arrangement pattern of the SPs is fixed to one kind of arrangement pattern. However, in Digital Video Broadcasting-Sound Generation Terrestrial (DVB-T.2), plural arrangement patterns (eight kinds of arrangement patterns) are determined as the arrangement pattern of the SPs. Also, the SPs are arranged in accordance with one of the plural arrangement patterns.

FIG. 3 is a block diagram showing a configuration of an example of an existing receiving apparatus for receiving the OFDM signal.

In FIG. 3, the receiving apparatus includes an antenna 11, a tuner 12, a Band-Pass Filter (BPS) 13, an Analog/Digital (A/D) conversion portion 14, an orthogonally demodulating portion 15, an offset correcting portion 16, an FFT control portion 17, an FFT portion 18, a transmission characteristics estimating section 19, a transmission path distortion correcting portion 20, and an error correcting portion 21.

The antenna 11 receives thereat a broadcasting wave of the OFDM signal which is transmitted (broadcasted) from a transmitting apparatus of a broadcasting station (not shown), converts the broadcasting wave thus received thereat into a Radio Frequency (RF) signal, and supplies the resulting RF signal to the tuner 12.

The tuner 12 extracts a signal having a predetermined frequency from the RF signal supplied thereto from the antenna 11, frequency-converts the signal having the predetermined frequency thus extracted into an Intermediate Frequency (IF) signal, and supplies the resulting IF signal to the BPF 13.

The BPF 13 filters the IF signal supplied thereto from the tuner 12, and supplies the resulting IF signal as an analog signal to the A/D conversion portion 14. The A/D conversion portion 14 subjects the IF signal as the analog signal supplied thereto from the BPF 13 to the A/D conversion, and supplies the resulting IF signal as a digital signal to the orthogonally demodulating portion 15.

The orthogonally demodulating portion 15 orthogonally demodulates the IF signal as the digital signal supplied thereto from the A/D conversion portion 14 by using a carrier having a predetermined frequency (carrier frequency) and outputs the resulting OFDM signal in a base band.

Here, the OFDM signal which is outputted by the orthogonally demodulating portion 15 is a signal in a time region before an FFT arithmetic operation is carried out (right after a transmission symbol on an IQ constellation has been subjected to the IFFT arithmetic operation on the transmitting apparatus side). Hereinafter, the OFDM signal is referred to as "an OFDM time region signal" as well.

The OFDM time region signal is a complex signal expressed by a complex number containing therein a real axis component (In Phase (I) component) and an imaginary axis component (Quadrature Phase (Q) component).

The OFDM time region signal is supplied from the orthogonally demodulating portion 15 to the offset correcting portion 16.

The offset correcting portion 16 carries out correction for a sampling offset (a shift in a sampling timing) in the A/D conversion portion 104 with the OFDM time region signal supplied thereto from the orthogonally demodulating portion 15 as an object. Also, the offset correcting portion 16 carries out correction for an offset of a frequency of a carrier (a shift with respect to a frequency of a carrier used in the transmitting portion) in the orthogonally demodulating portion 15.

In addition, the offset correcting portion 16, for example, carries out filtering for removing the same channel interference and an adjacent channel interference, or the like as may be necessary.

The OFDM time region signal which has been processed in the offset correcting portion 16 is supplied to each of the FFT control portion 17 and the FFT portion 18.

The FFT control portion 17, for example, carries out an arithmetic operation for a correlation between the OFDM time region signals supplied thereto from the offset correcting portion 16, thereby detecting a start position of an FFT interval (FFT start position) as an interval of the OFDM time region signals as an object of the FFT arithmetic operation in the FFT portion 18. Also, the FFT control portion 17 supplies a timing signal representing the FFT start position to the FFT portion 18.

The FFT portion 18 carries out the FFT arithmetic operation for the OFDM time region signal supplied thereto from the offset correcting portion 16 in accordance with the timing signal supplied thereto from the FFT control portion 17. Carrying out the FFT arithmetic operation for the OFDM time region signal results in that data transmitted on the sub-carrier, that is, an OFDM signal representing a transmission symbol on an IQ constellation is obtained.

Here, the OFDM signal obtained through the FFT arithmetic operation for the OFDM time region signal is a signal in a frequency region, and is hereinafter referred to as "an OFDM frequency region signal" as well.

The FFT portion 18 supplies the OFDM frequency region signal obtained through the FFT arithmetic operation to each of the transmission path characteristics estimating section 19 and the transmission path distortion correcting portion 20.

The transmission path characteristics estimating section 19 estimates the transmission path characteristics for the sub-carriers (transmission symbols) of the OFDM signal by using the pilot signals SPs arranged in the manner as shown in FIG. 2 in the OFDM frequency region signal supplied thereto from the FFT portion 18. Also, the transmission path characteristics estimating section 19 supplies the transmission path characteristic data as an estimate value of the transmission path characteristics to the transmission path distortion correcting portion 20.

The transmission path distortion correcting portion 20 carries out the distortion correction for correcting distortions of a amplitude and a phase of the sub-carrier of the OFDM signal caused in the transmission path by using the transmission path characteristic data supplied thereto from the transmission path characteristics estimating section 19 with the OFDM frequency region signal supplied thereto from the FFT portion 18 as an object. In this case, for example, the transmission path distortion correcting portion 20 carries out the distortion correction for the OFDM frequency region signal by, for example, dividing the OFDM frequency region signal by the transmission path characteristic data. Also, the transmission path distortion correcting portion 20 supplies the OFDM frequency region signal obtained after completion of the distortion correction to the error correcting portion 21.

The error correcting portion 21 executes necessary error correcting processing with the OFDM frequency region signal supplied thereto from the transmission path distortion correcting portion 20 as an object. That is, for example, the error correcting portion 21 carries out de-interleave, de-puncture, Viterbi decoding, diffusion signal removal, Low Density Parity Check (LDPC) decoding, and Reed-Solomon (RS) decoding, and outputs the resulting decoded data.

FIG. 4 is a block diagram showing an example of a configuration of the transmission path characteristics estimating section 19 shown in FIG. 3.

In FIG. 4, the transmission path characteristics estimating section 19 includes a pilot extracting portion 31, a reference signal generating portion 32, an estimating portion 33, a time direction interpolating portion 34, and a frequency direction interpolating part 35. In addition, the frequency direction interpolating part 35 includes a position adjusting portion 36, a filter center controlling portion 37, an up-sampling portion 38, and an interpolation filter 39.

The OFDM frequency region signal which has been supplied from the FFT portion 18 to the transmission path characteristics estimating section 19 is in turn supplied to the pilot extracting portion 31.

The pilot extracting portion 31 extracts the transmission symbols of the SPs, for example, arranged in the manner as shown in FIG. 2 from the OFDM frequency region signal supplied thereto from the FFT portion 18, and supplies the transmission symbols of the SPs thus extracted to the estimating portion 33.

The reference signal generating portion 32 generates (the transmission symbol of) the same SP as that contained in the OFDM signal by the transmitting apparatus. Also, the reference signal generating portion 32 supplies (the transmission symbol of) the SP thus generated as a reference signal becoming a reference in estimation of the transmission path characteristics for the transmission symbols of the pilot signals contained in the OFDM frequency region signal to the estimating portion 33.

Here, in the case of the ISDB-T standard and the DVB-T standard, the transmission symbol of the pilot signal is a signal obtained by subjecting predetermined data to Binary Phase Shift Keying (BPSK) modulation. Then, the reference signal generating portion 32 generates the transmission symbol obtained by subjecting the predetermined data to the BPSK modulation, and supplies the transmission symbol thus generated as a reference signal to the estimating portion 33.

The estimating portion 33 estimates the transmission path characteristics for the transmission symbol of the SP (hereinafter referred to as "the SP transmission path characteristics" as well) by dividing the transmission symbol of the SP supplied thereto from the pilot extracting portion 31 by the reference signal supplied thereto from the reference signal generating portion 32. Also, the estimating portion 33 supplies SP transmission path characteristic data as an estimate value of the transmission path characteristics to the time direction interpolating portion 34.

Here, the distortion of the OFDM signal caused by the transmission path (the distortion due to the multi-path or the like) comes to form multiplication for the OFDM signal. Therefore, the estimation of the SP transmission path characteristics as a distortion component of the OFDM signal caused by the transmission path can be carried out by dividing the transmission symbol of the SP supplied from the pilot extracting portion 31 by the reference signal.

The time direction interpolating portion 34 carries out the interpolation for the time direction by using the SP transmission path characteristic data supplied thereto from the estimating portion 33 in a symbol number direction (in a time direction). Also, the time direction interpolating portion 34 supplies time direction interpolation characteristic data obtained through the interpolation to the frequency direction interpolating part 35.

The frequency direction interpolating part 35 carries out filtering for interpolating the time direction interpolation characteristic data supplied thereto from the time direction interpolating portion 34 in the frequency direction. Thereby, the frequency direction interpolating part 35 supplies transmission path characteristic data (hereinafter referred to as "frequency direction interpolation characteristic data" as well) as the estimate value for estimation of the transmission path characteristics in which the interpolation in the frequency direction is carried out, in a word, the transmission path characteristics for the transmission symbols (sub-carriers) of the OFDM symbols to the transmission path distortion correcting portion 20.

That is to say, in the frequency direction interpolating part 35, the time direction interpolation characteristic data supplied from the time direction interpolating portion 34 is supplied to each of the position adjusting portion 36 and the filter center controlling portion 37.

The position adjusting portion 36 adjusts (rotates) a phase of the time direction interpolation characteristics supplied thereto from the time direction interpolating portion 34 in accordance with optimal position information supplied from the filter center controlling portion 37. Also, the position adjusting portion 36 supplies time direction interpolation characteristic data obtained through the adjustment of the phase of the time direction interpolation characteristics to the up-sampling portion 38.

On the other hand, the time direction interpolation characteristic data is supplied from the time direction interpolating portion 34 to the filter center controlling portion 37. In addition thereto, the OFDM frequency region signal is also supplied from the FFT portion 18 to the filter center controlling portion 37.

The filter center controlling portion 37 carries out filtering for the time direction interpolation characteristic data supplied thereto from the time direction interpolating portion 34, that is, (time direction interpolation characteristic data obtained by carrying out the interpolation in the time direction for) SP transmission path characteristic data obtained by using the SP by using an interpolation filter (not shown) while a position of a filter center is adjusted. Thereby, the filter center controlling portion 37 obtains transmission path characteristic data (frequency direction interpolation characteristic data) as an estimate value of the transmission path characteristics for the transmission symbols of the OFDM frequency direction region signal.

In addition, the filter center controlling portion 37 carries out distortion correction for (the transmission symbols of) the OFDM frequency region signal supplied thereto from the FFT portion 18 by using the transmission path characteristic data. Also, the filter center controlling portion 37 obtains a signal quality of the OFDM frequency region signal after completion of the distortion correction with the predetermined symbol as an object.

Here, in the filter center controlling portion 37, for example, with regard to the ISDB-T, information on the signal quality is obtained with the transmission symbol of Transmission and Multiplexing Configuration Control (TMCC)/ Auxiliary Channel (AC) as an object. Also, with reference to the DVB-T, information on the signal quality is obtained with the transmission symbol of Transmission Parameters Signalling (TPS) as an object.

With regard to the signal quality, it is possible to adopt a distance (on the IQ constellation) between the transmission symbol after completion of the distortion correction, for example, corresponding to an amount of noise in the transmission symbol after completion of the distortion correction, and a hard decision value of that transmission symbol. In this case, the signal quality represents that the smaller the value, the better the quality.

The filter center controlling portion 37 obtains information on the signal quality of the OFDM frequency region signal after completion of the distortion correction while the position of the filter center (of the interpolation filter (not shown)) is adjusted, and obtains information on a position of the filter center in which the signal quality becomes optimal (hereinafter referred to as "an optimal position" as well).

Also, the filter center controlling portion 37 controls the position of the filter center of the interpolation filter 39 in such a way that the position of the filter center of the interpolation filter 39 becomes the optimal position.

That is to say, the filter center controlling portion 37 supplies optimal position information representing the optimal position to the position adjusting portion 36.

As has been described, the position adjusting portion 36 adjusts the phase of the time direction interpolation characteristic data supplied thereto from the time direction interpolating portion 34 in accordance with the optimal position information supplied thereto from the filter center controlling portion 37, that is, rotates the time direction interpolation characteristic data on the IQ constellation. Thereby, the position of the filter center in the phase of the filtering for the time direction interpolation characteristic data in the interpolation filter 39 which will be described later is made to agree with the position represented by the optimal position information.

In the manner as described above, the up-sampling portion 38 interpolates zeros the number of which is equal to the number of transmission symbols for which no estimate value of the transmission path characteristics is obtained when viewed in the frequency direction, for example, two zeros between the sample values of the time direction interpolation characteristic data after completion of the adjustment of the phase obtained in the position adjusting portion 36. Thereby, the up-sampling portion 38 generates time direction interpolation characteristic data in which an amount of data (the number of sample values) is made three times as large as original one, and supplies the time direction interpolation characteristic data thus generated to the interpolation filter 39.

The interpolation filter 39 is a Low-Pass Filter (LPF) for carrying out the filtering for the interpolation in the frequency direction. Thus, the interpolation filter 39 carries out the filtering for the time direction interpolation characteristic data supplied thereto from the up-sampling portion 38.

The filtering carried out by the interpolation filter 39 results in removal of a repetitive component generated in the time direction interpolation characteristic data by the interpolation of zeros in the up-sampling portion 38. Thus, there is obtained frequency direction interpolation characteristic data as an estimate value of the transmission path characteristics for which the interpolation in the frequency direction is carried out, that is, the transmission path characteristics for the transmission symbols (sub-carriers) of the OFDM symbols.

The frequency direction interpolation characteristic data which has been obtained in the interpolation filter 39 in the manner as described above is supplied in turn as transmission path characteristic data used for the distortion correction of the OFDM signal to the transmission path distortion correcting portion 20.

Here, the transmission path characteristics estimating section 19 supplies not only the transmission path characteristic data obtained in the interpolation filter 39, but also the optimal position information obtained in the filter center controlling portion 37 to the transmission path distortion correcting portion 20.

The transmission path distortion correcting portion 20 adjusts (rotates) the phase of the OFDM frequency region signal from the FFT portion 18 in accordance with the optimal position information supplied thereto from the transmission path characteristics estimating section 19. After that, the transmission path distortion correcting portion 20 divides the OFDM frequency region signal by the transmission path characteristic data supplied thereto from the transmission path characteristics estimating section 19, thereby carrying out the distortion correction for the OFDM frequency region signal.

FIG. 5 is a diagram explaining the time direction interpolation characteristic data as the estimate values of the transmission path characteristics which the time direction interpolating portion 34 shown in FIG. 4 obtains by using the transmission path characteristic data (SP transmission path characteristic data) on the positions of the SPs shown in FIG. 2, and for which the interpolation in the time direction is carried out.

In FIG. 5, circle marks (an open circle mark and a shaded circle mark) represent the transmission symbols (sub-carriers) of the OFDM signal.

In addition, in FIG. 5, the shaded circle mark represents the transmission symbol in which the estimate value of the transmission path characteristics is contained in the time direction interpolation characteristic data (a sample value of the time direction interpolation characteristic data exists).

According to the interpolation in the time direction carried out in the time direction interpolating portion 34, as shown in FIG. 5, the estimate value of the transmission path characteristics for each three transmission symbols (in the frequency direction) can be obtained from the OFDM signal in which the SPs are arranged in the manner as shown in FIG. 2 with respect to each of the OFDM symbols.

FIG. 6 is a diagram explaining the frequency direction interpolation characteristic data as the estimate values of the transmission path characteristics which are obtained by the frequency direction interpolating part 35 by using the time direction interpolation characteristic data as the estimate values of the transmission path characteristics of the transmission symbols each indicated by a shaded circle mark in FIG. 5 and for which the interpolation in the frequency direction is carried out.

The frequency direction interpolating part 35 carries out the interpolation for the time direction interpolation characteristic data in which the estimate value of the transmission path characteristics is obtained every three transmission symbols in the sub-carrier number direction (in the frequency direction). Thereby, the frequency direction interpolating part 35 obtains frequency direction interpolation characteristic data as the estimate values of the transmission path characteristics of the respective transmission symbols of the OFDM symbols. In this case, the frequency direction interpolation characteristic data is surrounded with a shaded rectangle shown in FIG. 6.

That is to say, in the frequency direction interpolating part 35, the position adjusting portion 36 adjusts the phase of the time direction interpolation characteristic data supplied thereto from the time direction interpolating portion 34 in accordance with the optimal position information supplied thereto from the filter center controlling portion 37. Also, the position adjusting portion 36 supplies the time direction interpolation characteristic data after completion of the phase adjustment to the up-sampling portion 38.

The up-sampling portion 38 interpolates two zeros between the sample values of the time direction interpolation characteristic data (refer to FIG. 5) supplied thereto from the position adjusting portion 36 to generate the time direction interpolation characteristic data in which the amount of data is made three times as large as original one, and supplies the time direction interpolation characteristic data thus generated to the interpolation filter 39.

That is to say, as shown in FIG. 5, the time direction interpolation characteristic data supplied from the position adjusting portion 36 to the up-sampling portion 38 has an arrangement pattern (system) in which the estimation value of the transmission path characteristics is arranged every three transmission symbols when viewed in the frequency direction.

Therefore, with regard to the time direction interpolation characteristic data supplied from the position adjusting portion 36 to the up-sampling portion 38, only the two transmission symbols for each of which the transmission path characteristics have not been estimated exist between the transmission symbols for each of which the transmission path characteristics have been estimated when viewed in the frequency direction. For this reason, the up-sampling portion 38 interpolates the two zeros each becoming a sample point of the transmission path characteristics for the two transmission symbols for each of which the transmission path characteristics have not been estimated.

As has been described, the number of zeros interpolated in the up-sampling portion 38 differs depending on every how many transmission symbols when viewed in the frequency direction, the estimate values of the transmission path characteristics are arranged in the system which the time direction interpolation characteristic data obtained in the time direction interpolating portion 34 has.

As has been described, when in the up-sampling portion 38, the two zeros are interpolated between the sample values of the time direction interpolation characteristic data supplied from the position adjusting portion 36, time direction interpolation characteristic data (hereinafter referred to as "0 value interpolation characteristic data" as well) obtained from the interpolation result contains therein the repetitive component in the time region.

That is to say, the time direction interpolation characteristic data is data obtained from the OFDM frequency region signal, and is also data in the frequency region.

Also, the time direction interpolation characteristic data, and the 0 value interpolation characteristic data obtained by interpolating zeros in the time direction interpolation characteristic data are the same signal in terms of an analog signal. Therefore, data in the time region of the time direction interpolation characteristic data, and data in the time region of the 0 value interpolation characteristic data become data having the same frequency components.

In addition, the time direction interpolation characteristic data has the system of the estimate values of the transmission path characteristics for each three transmission symbols. The interval between the transmission symbols (sub-carriers) in the frequency direction, as described above, is expressed by $Fc=1/Tu$ Hz. Therefore, an interval between the sample values (estimate values) of the time direction interpolation characteristic data as the system of the estimate value of the transmission path characteristics for each three transmission symbols (in the frequency direction) is expressed by $3Fc=3/Tu$ Hz.

Therefore, an interval between the sample values of the 0 value interpolation characteristic data obtained by interpolating the two zeros between the sample values of the time direction interpolation characteristic data is expressed by $Fc=1/Tu$ Hz.

The time direction interpolation characteristic data in which the interval between the sample values is expressed by $3Fc=3/Tu$ Hz is data in which $1/3Fc=Tu/3$ sec. is set as one period in the time region.

In addition, the 0 value interpolation characteristic data in which the interval between the sample values is expressed by $Fc=1/Tu$ Hz is data in which $1/Fc=Tu$ sec. is set as one period in the time region, that is, data in which a period of time which is three times as long as the period of the time direction interpolation characteristic data is set as one period.

As has been described, the data in the time region of the 0 value interpolation characteristic data which contains therein the same frequency components as those of the data in the time region of the time direction interpolation characteristic data, and in which the period of time which is three times as long as the period of the data in the time region of the time direction interpolation characteristic data is set as one period is obtained by repeating the data in the time region of the time direction interpolation characteristic data three times.

That is to say, FIG. 7 shows the data in the time region of the 0 value interpolation characteristic data.

It is noted that in the following description, for ease of a description, it is assumed that the multi-path is composed of two paths (consisting of a main path and one echo) (two wave environment).

In FIG. 7 (to which FIG. 10 as will be described later is also similar), an axis of abscissa represents time, and an axis of ordinate represents a power level of a path (OFDM signal).

(The data in the time region of) The 0 value interpolation characteristic data having a period of Tu sec. is obtained by repeating the multi-path corresponding to (the data in the time region of) the time direction interpolation characteristic data having a period of Tu/3 sec. three times.

Now, in the 0 value interpolation characteristic data, of the multi-paths corresponding to the time direction interpolation characteristic data which is repeated three times, the second round of the multi-path (center multi-path) (indicated by slanting lines in FIG. 7) is assumed to be a desired multi-path which is extracted as the frequency direction interpolation characteristic data. In this case, for the purpose of obtaining the desired multi-path corresponding to the frequency direction interpolation characteristic data, it is necessary to remove all of other multi-paths.

Then, the interpolation filter 39 (refer to FIG. 4) removes all of the multi-paths other than the desired multi-path by filtering the 0 value interpolation characteristic data, thereby extracting the desired multi-path corresponding to the frequency direction interpolation characteristic data.

Note that, the 0 value interpolation characteristic data is the data in the frequency region. Thus, the filtering for the 0 value interpolation characteristic data in the interpolation filter 39 becomes the convolution of a filter coefficient of the interpolation filter 39, and the 0 value interpolation characteristic data as the data in the frequency region.

The convolution in the frequency region becomes the multiplication with a window function in the time region as a pass band of the interpolation filter 39. As a result, the filtering for the 0 value interpolation characteristic data in the interpolation filter 39 can be expressed in the form of the multiplication of (the data in the time region of) the 0 value interpolation characteristic data, and the window function as the pass band of the interpolation filter 39 in the time region.

In FIG. 7 (to which FIG. 10 as will be described later is also similar), the filtering for the 0 value interpolation characteristic data is expressed in the form of the multiplication of the 0 value interpolation characteristic data and (the window function corresponding to) the pass band of the interpolation filter 39.

In the 0 value interpolation characteristic data, the period of the multi-path which is repeated three times is Tu/3 sec. Therefore, the interpolation filter 39, for example, is configured as an LPF in which a band of −Tu/6 to +Tu/6 of the same band width as the period of Tu/3 sec. of the multi-path repeated three times is used as the pass band, thereby making it possible to extract the desired multi-path corresponding to the frequency direction interpolation characteristic data.

It is noted that the adjustment of the band width of the pass band of the interpolation filter 39 makes it possible to reduce the noise contained in the 0 value interpolation characteristic data (time direction interpolation characteristic data). This technique, for example, is described in Japanese Patent Laid-Open No. 2005-312027.

In addition, the filter center controlling portion (refer to FIG. 4) controls the position of the center of the pass band (the position of the filter center) in such a way that as shown in FIG. 7, the desired multi-path is contained in the pass band of the interpolation filter 39.

That is to say, as has been described, the filter center controlling portion 37 obtains the optimal position information on the position (optimal position) of the filter center where the signal quality of the OFDM signal (frequency region OFDM signal) after completion of the distortion correction is made best. Also, the filter center controlling portion 37 supplies the optimal position information representing the optimal position to the position adjusting portion 36 (refer to FIG. 4).

The position adjusting portion 36 adjusts (rotates) the phase of the time direction interpolation characteristic data in accordance with the optimal position information supplied thereto from the filter center controlling portion 37 in such a way that as shown in FIG. 7, the desired multi-path is contained in the pass band of the interpolation filter 39.

As a result, the position of the filter center (the center of the pass band) of the interpolation filter 39 is controlled in such a way that the desired multi-path is relatively contained in the pass band of the interpolation filter 39.

Here, when a part of the desired multi-path is not contained in the pass band of the interpolation filter 39, the estimation precision for the transmission characteristics in the transmission path characteristics estimating section 19 is deteriorated. As a result, the noise contained in the OFDM frequency region signal after completion of the distortion correction is increased to reduce the signal quality.

For this reason, the filter center controlling portion 37 obtains the position (optimal position) of the filter center where the signal quality of the OFDM frequency region signal after completion of the distortion correction is made best. Also, the filter center controlling portion 37 controls the position of the filter center of the interpolation filter 39 in such a way that the position of the filter center of the interpolation filter 39 is made to agree with the optimal position.

Now, in the case of the DVB-T or the ISDB-T, the arrangement pattern of the SPs is fixed to one kind of arrangement pattern. In addition thereto, the position of the transmission symbol of the TPS as an object for the obtaining of the signal quality, and the position of the transmission symbol of the TMCC/AC are also fixed. Therefore, there are carried out the estimation of the transmission path characteristics from the SPs, the distortion correction for the OFDM frequency region signal using the estimate values for the transmission path characteristics, and the calculations of the signal quality of the transmission symbol of the TPS of the OFDM frequency region after completion of the distortion correction, and the signal quality of the transmission symbol of the TMCC/AC. Thus, the position of the filter center of the interpolation filter 39 can be controlled in such a way that these signal qualities become best.

On the other hand, in the case of the DVB-T.2, as has been described, plural arrangement patterns (eight kinds of arrangement patterns) are determined as the arrangement parameters of the SPs. Also, any one of the plural arrangement patterns is selected, and the SPs are arranged in accordance with the arrangement pattern thus selected. Also, in the case of the DVB-T.2, the information on the arrangement pattern of the SPs is transmitted in a state of being specially contained in the OFDM signal.

In this case, the arrangement pattern of the SPs cannot be recognized until the information on the arrangement pattern of the SPs is decoded. As a result, the position of the filter center of the interpolation filter 39 becomes difficult to control in such a way that the signal quality becomes best, and thus the estimation precision for the transmission path characteristics is deteriorated.

That is to say, in the case of (a blue book of) the DVB-T.2, a frame called a T2 frame is defined, and the data is transmitted in T2 frames.

(The OFDM signal of) The T2 frame contains therein two kinds of Preamble signals called P1 and P2, respectively, and information necessary for the processing such as the decoding of the OFDM signal is contained in the preamble signals.

FIG. 8 is a diagram showing a format of the T2 frame.

An OFDM symbol of one P1 (hereinafter referred to as "a P1 symbol" as well), OFDM symbols of one or more P2 (hereinafter referred to as "P2 symbols" as well), OFDM symbols of one or more pieces of the data (Normal) (hereinafter referred to as "data symbols" as well), and OFDM symbols of necessary Frame Closing (FC) are contained in this order in the T2 frame.

Bits S1 and S2 are contained in P1 Signalling (P1).

The bits S1 and S2 contain therein information as to whether or not the frame is the T2 frame, and information as to whether or not the T2 frame and a Future Extension Frame (FEF) are mixed with each other in terms of the frame.

In addition, the bits S1 and S2 contain therein information as to in accordance with which of a Single Input Single Output (SISO) system and a Multiple Input, Single Output (MISO) system the OFDM symbols (the P2 symbols, the data symbols, and the OFDM symbol of the FC) other than the P1 symbol is transmitted. Also, the bits S1 and S2 contain therein an FFT size (the number of samples (transmission symbols) (sub-carriers) as an object for one FFT arithmetic operation) when the FFT arithmetic operation for the OFDM symbols other than the P1 symbol is carried out, and the like.

It is noted that six kinds of sizes: 1K, 2K, 4K, 8K, and 16K are regulated as the number of transmission symbols (sub-carriers) composing one OFDM symbol, in a word, as the FFT size.

However, although with regard to the OFDM symbols other than the P1 symbol, any of the six kinds of FFT sizes described above can be used, with regard to the P1 symbol, only 1K of the six kinds of FFT sizes described above is used.

In addition, in the P2 symbol, the data (Normal) symbol, and the OFDM symbol of the FC, the same value is adopted as the FFT size and the Guard Internal (GI) length.

Here, since the P1 symbol contains therein information on the transmission system, the FFT size, and the like which are necessary for demodulation of the P2 symbols, the P1 symbol needs to be demodulated in order to demodulate the P2 symbols.

L1 composed of L1pre Signalling (L1pre) and L1post Signalling (L1post) is contained in the P2.

The L1pre contains therein a parameter necessary to decode the L1post, and a parameter necessary to demodulate the data symbol (and the OFDM symbol of the FC).

That is to say, for example, information on a modulation system (such as the BPSK) for the L1post, and the like are contained as the parameters necessary to decode the L1post in the L1pre. In addition, for example, a pilot pattern (PP) representing the arrangement pattern of the transmission symbols of the pilot signals (SPs), information as to presence or absence of extension of the transmission band with which the OFDM signal is transmitted (Extended carrier mode or Normal carrier mode), information as to the number of OFDM symbols contained in one T2 frame (T2 frame length), and the like are contained as the parameters necessary to demodulate the data symbols in the L1pre.

Here, eight kinds of pilot patterns PP1 to PP8 are determined as the arrangement pattern of the transmission symbols of the SPs in the data symbols in the DVB-T.2. In the data symbols, the transmission symbols of the SPs are arranged in accordance with one of the eight kinds of pilot patterns PP1 to PP8. A pilot pattern as the arrangement pattern of the transmission symbols of the SPs of the data symbols is contained in the L1pre.

The L1post contains therein information necessary for the receiving apparatus to access a Physical Layer Pipe (PLP).

That is to say, information on a modulation system for the PLP, information on a size and a position of the PLP within the T2 frame, and the like are contained as information necessary to access the PLP in the L1post.

When the receiving apparatus detects and decodes the P1 symbol to estimate the G1 length, the receiving apparatus can demodulate the P2 symbols. In addition, when the P2 symbols are demodulated, the L1pre can be decoded. Also, when the L1pre is decoded, the L1post can be decoded. Also, after that, the data symbol (and the OFDM symbol of the FC) can be demodulated.

It is noted that although in FIG. 8, two P2 symbols are arranged in the T2 frame, in the DVB-T.2, the number of P2 symbols arranged in the T2 frame is determined from the size of the FFT of the P2 symbol (and the data symbol).

For example, when the FFT size of the P2 symbol is either 32K or 16K, one P2 symbol is arranged in the T2 frame. In addition, for example, when the FFT size of the P2 symbol is 8K, two P2 symbols are arranged in the T2 frame.

FIG. 9 is a diagram showing a structure of the P1 symbol.

The P1 symbol has 1K (=1,024) transmission symbols as effective symbols.

Also, the P1 symbol has the following cyclic structure. That is to say, a signal B1' which is obtained by frequency-shifting a part B1 on the head side is copied on a preceding side (on a preceding side in terms of time) of the effective symbols. Also, a signal B2' which is obtained by frequency-shifting a remaining part B2 of the effective symbols is copied on a back side (on a following side in terms of time) of the effective symbols.

As has been described, since the P1 symbol has the cyclic structure, the receiving apparatus carries out an arithmetic operation for the correlation of the OFDM signals, thereby making it possible to detect the P1 symbol.

Also, when the receiving apparatus detects and decodes the P1 symbol, and also estimates a G1 length, the receiving apparatus can demodulate the P2 symbol and also can decode the L1 (consisting of L1pre and L1post).

Therefore, when the receiving apparatus does not demodulate the P2 symbol, the receiving apparatus cannot decode the L1, and also cannot recognize the pilot pattern of the data symbols.

Also, when the receiving apparatus cannot recognize the pilot pattern of the data symbols, the receiving apparatus cannot control the position of the filter center of the interpolation filter 39 by using the data symbols.

From the above, in the receiving apparatus, the control for the position of the filter center (hereinafter referred to as "the filter center position control" as well) of the interpolation filter 39 (refer to FIG. 4) cannot be carried out until the L1 has been decoded to recognize (acquire) the pilot pattern of the data symbols.

Therefore, the receiving apparatus cannot carry out the filter center position control until the L1 has been decoded after the starting of the reception of the OFDM signal.

SUMMARY

As described above, with regard to the OFDM signal in which the pilot pattern of the data symbols is contained in the preamble signal such as the L1, the receiving apparatus cannot carry out the filter center position control using the data symbols until the L1 as the preamble signal has been decoded after starting of the reception of the OFDM signal. Thus, until the L1 has been decoded, the position of the filter center, for example, is fixed to a certain position.

Therefore, during the demodulation, of the P2 symbols, which is carried out before the L1 has been decoded after starting of the reception of the OFDM signal, the position of the filter center is held fixed.

When the position of the filter center is held fixed, with regard to a multi-path (a multi-path in which delay spreading is large) in which a delay of the echo is large, for example, it readily comes to occur that (the path of) the echo is not contained in the pass band of the interpolation filter 39.

Also, in particular, with regard to the multi-path having a low Desired to Undesired Ratio (low D/U) (the multi-path in which a power of the echo (undesired) is close to a power of a main path (Desired)), when the echo having a large power is not contained in the pass band of the interpolation filter 39, the estimation precision for the transmission path characteristics is largely deteriorated. As a result, the suitable distortion correction is not carried out for the P2 symbols, and thus the L1 contained in the P2 symbols fails in decoding in some cases.

FIG. 10 is a graphical representation explaining the filtering, for the 0 value interpolation characteristic data by the interpolation filter 39, which is carried out with the position of the filter center being fixed without carrying out the filter center position control.

That is to say, FIG. 10 shows the data in the time region of the 0 value interpolation characteristic data.

When the position of the filter center is fixed without carrying out the filter center position control, as shown in FIG. 10, the possibility that a part of the desired multi-path (indicated by slant lines in FIG. 10) comes to be out of the pass band of the interpolation filter 39 becomes high.

Here, in FIG. 10, the position of the filter center is fixed to the position of the main path of the multi-path, and the echo is out of the pass band of the interpolation filter 39 (the echo is not contained in the pass band).

In each of the P2 symbols, the transmission symbols of the pilot signals (P2 pilot signals) are arranged in the frequency direction with a period of Dx.

Here, in the DVB-T.2, the period, Dx, of the P2 pilot signals of the P2 symbols depends on the FFT size of the P2 symbols. Thus, when the FFT size is 32K, the period, Dx, is 6, and when the FFT size is equal to or smaller than 16K, the period, Dx, is 3.

When the pilot signals are arranged in the frequency direction with the period of Dx, by using the pilot signal, in the filtering, of the interpolation filter 39, for obtaining the frequency direction interpolation characteristic data in which (the estimate values of) the transmission path characteristics in the frequency direction are interpolated, for the purpose of extracting only the desired multi-path (for the purpose of removing any of the multi-paths other than the desired multi-path), the pass band needs to be made equal to or smaller than Tu/Dx sec. (where Tu is the effective symbol length).

Therefore, when the position of the filter center of the interpolation filter 39 is suitably controlled, with respect to the multi-path having the delay spreading of Tu/Dx in the maximum situation, it is possible to obtain the precise frequency direction interpolation characteristic data, in a word, it is possible to precisely estimate the transmission path characteristics.

However, when the position of the filter center of the interpolation filter 39 is held fixed, that is, for example, as shown in FIG. 10, when the position of the filter center of the interpolation filter 39 is fixed to the position of the main path (of the desired multi-path), with regard to the multi-path having such large delay spreading as to exceed Tu/(2×Dx), it may be impossible to contain the entire multi-path in the pass band (for example, the echo is out of the pass band). Thus, the estimation precision for the transmission path characteristics is deteriorated. As a result, the possibility that the suitable distortion correction is not carried out for the P2 symbols to fail in decoding of the L1 contained in the P2 symbols becomes high.

The present disclosure has been made in order to solve the problems described above, and it is therefore desirable to provide a receiving apparatus, a receiving method, and a receiving system each of which is capable of preventing deterioration of estimation precision for transmission path characteristics.

In order to solve the desire described above, according to an embodiment of the present disclosure, there is provided a receiving apparatus including: a transmission path characteristics estimating section obtaining pre-interpolation transmission path characteristic data as estimate values for transmission path characteristics as characteristics of a transmission path of an Orthogonal Frequency Division Multiplexing (OFDM) signal for transmission symbols of pilot signals by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal; a distortion correcting section carrying out distortion correction for the OFDM signal by using the transmission path characteristic data; and a filter controlling section controlling a pass band of the interpolation filter. The OFDM signal contains therein a preamble symbol in which a transmission symbol of a preamble signal, and a transmission symbol of the pilot signal are arranged in positions previously determined, respectively; and the filter controlling section controls the pass band of the interpolation filter by using the transmission symbol of the preamble symbol.

According to another embodiment of the present disclosure, there is provided a receiving method including: obtaining pre-interpolation transmission path characteristic data as estimate values for transmission path characteristics as characteristics of a transmission path of an Orthogonal Frequency Division Multiplexing (OFDM) signal for transmission symbols of pilot signals by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal by a transmission path characteristics estimating section; carrying out distortion correction for the OFDM signal by using the transmission path characteristic data by a distortion correcting section; and controlling a pass band of the interpolation filter by a filter controlling section. The OFDM signal contains therein a preamble symbol in which a transmission symbol of a preamble signal, and a transmission symbol of the pilot signal are arranged in positions previously determined, respectively; and a receiving apparatus including the transmission path characteristics estimating section, the distortion correcting section and the filter controlling section controls a pass band of the interpolation filter by using the transmission symbol of the preamble symbol.

According to still another embodiment of the present disclosure, there is provided a receiving system including: a transmission path decoding processing portion subjecting a signal acquired through a transmission path to transmission path decoding processing including at least processing for correcting an error caused in the transmission path; and an information source decoding processing section subjecting the signal subjected to the transmission path decoding processing to information source decoding processing including at least processing for expanding compressed information to original information. The signal acquired through the transmission path is an Orthogonal Frequency Division Multiplexing (OFDM) signal containing therein a preamble symbol in which a transmission symbol of a preamble signal, and a transmission symbol of a pilot signal are arranged in positions previously determined, respectively. The transmission path decoding processing portion includes: a transmission path characteristics estimating section obtaining pre-interpolation transmission path characteristic data as estimate values for transmission path characteristics as characteristics of the transmission path of the OFDM signal for the transmission symbols of the pilot signals by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal; a distortion correcting section carrying out distortion correction for the OFDM signal by using the transmission path characteristic data; and a filter controlling section controlling a pass band of the interpolation filter. The filter controlling section controls the pass band of the interpolation filter by using the transmission symbol of the preamble symbol.

According to yet another embodiment of the present disclosure, there is provided a receiving system including: a transmission path decoding processing portion subjecting a signal acquired through a transmission path to transmission path decoding processing including at least processing for correcting an error caused in the transmission path; and an outputting portion outputting an image or a sound in accordance with the signal subjected to the transmission path decoding processing. The signal acquired through the transmission path is an Orthogonal Frequency Division Multiplexing (OFDM) signal containing therein a preamble symbol in which a transmission symbol of a preamble signal, and a transmission symbol of a pilot signal are arranged in positions previously determined, respectively. The transmission path decoding processing portion includes: a transmission path characteristics estimating section obtaining pre-interpolation transmission path characteristic data as estimate values for transmission path characteristics as characteristics of the transmission path of the OFDM signal for the transmission symbols of the pilot signals by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal; a distortion correcting section carrying out distortion correction for the OFDM signal by using the transmission path characteristic data; and a filter controlling section controlling a pass band of the interpolation filter. The filter controlling section controls the pass band of the interpolation filter by using the transmission symbol of the preamble symbol.

According to a further embodiment of the present disclosure, there is provided a receiving system including: a transmission path decoding processing portion subjecting a signal acquired through a transmission path to transmission path decoding processing including at least processing for correcting an error caused in the transmission path; and recording portion recording therein the signal subjected to the transmission path decoding processing. The signal acquired through the transmission path is an Orthogonal Frequency Division Multiplexing (OFDM) signal containing therein a preamble symbol in which a transmission symbol of a preamble signal, and a transmission symbol of a pilot signal are arranged in positions previously determined, respectively. The transmission path decoding processing portion includes: a transmission path characteristics estimating section obtaining pre-interpolation transmission path characteristic data as estimate values for transmission path characteristics as characteristics of the transmission path of the OFDM signal for the transmission symbols of the pilot signals by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal; a distortion correcting section carrying out distortion correction for the OFDM signal by using the transmission path characteristic data; and a filter controlling section controlling a pass band of the interpolation filter The filter controlling section controls the pass band of the interpolation filter by using the transmission symbol of the preamble symbol.

According to an even further embodiment of the present disclosure, there is provided a receiving system including: an acquiring section acquiring a signal through a transmission path; and a transmission path decoding processing portion subjecting the signal acquired through the transmission path to transmission path decoding processing including at least processing for correcting an error caused in the transmission path. The signal acquired through the transmission path is an Orthogonal Frequency Division Multiplexing (OFDM) signal containing therein a preamble symbol in which a transmission symbol of a preamble signal, and a transmission symbol of a pilot signal are arranged in positions previously determined, respectively. The transmission path decoding processing portion includes: a transmission path characteristics estimating section obtaining pre-interpolation transmission path characteristic data as estimate values for transmission path characteristics as characteristics of the transmission path of the OFDM signal for the transmission symbols of the pilot signals by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal; a distortion correcting section carrying out distortion correction for the OFDM signal by using the transmission path characteristic data; and a filter controlling section controlling a pass band of the interpolation filter. The filter controlling section controls the pass band of the interpolation filter by using the transmission symbol of the preamble symbol.

In the six embodiments from the embodiment to the even further embodiment of the present disclosure, the pre-interpolation transmission path characteristic data as the estimate values for the transmission path characteristics as the characteristics of the transmission path of the Orthogonal Frequency Division Multiplexing (OFDM) signal for the transmission symbols of the pilot signals is obtained by using the pilot signals contained in the OFDM signal. The pre-interpolation transmission path characteristic data is filtered by using the interpolation filter, thereby obtaining the transmission path characteristic data as the estimate values for the transmission path characteristics for the transmission symbols of the OFDM signal. Also, the distortion correction for the OFDM signal is carried out by using the transmission path characteristic data. The preamble symbol in which the transmission symbol of the preamble signal and the transmission symbol of the pilot signal are arranged in the positions previously determined, respectively. Also, the pass band of the interpolation filter is controlled by using the transmission symbol of the preamble symbol.

It is noted that the receiving apparatus or the receiving system either may be an independent apparatus or system, or may be an internal block composing one apparatus or system.

As set forth hereinabove, according to the present disclosure, it is possible to prevent the deterioration of the estimation precision for the transmission path characteristics.

DETAILED DESCRIPTION OF THE PREFERRED EMBODIMENTS

Figure 11:
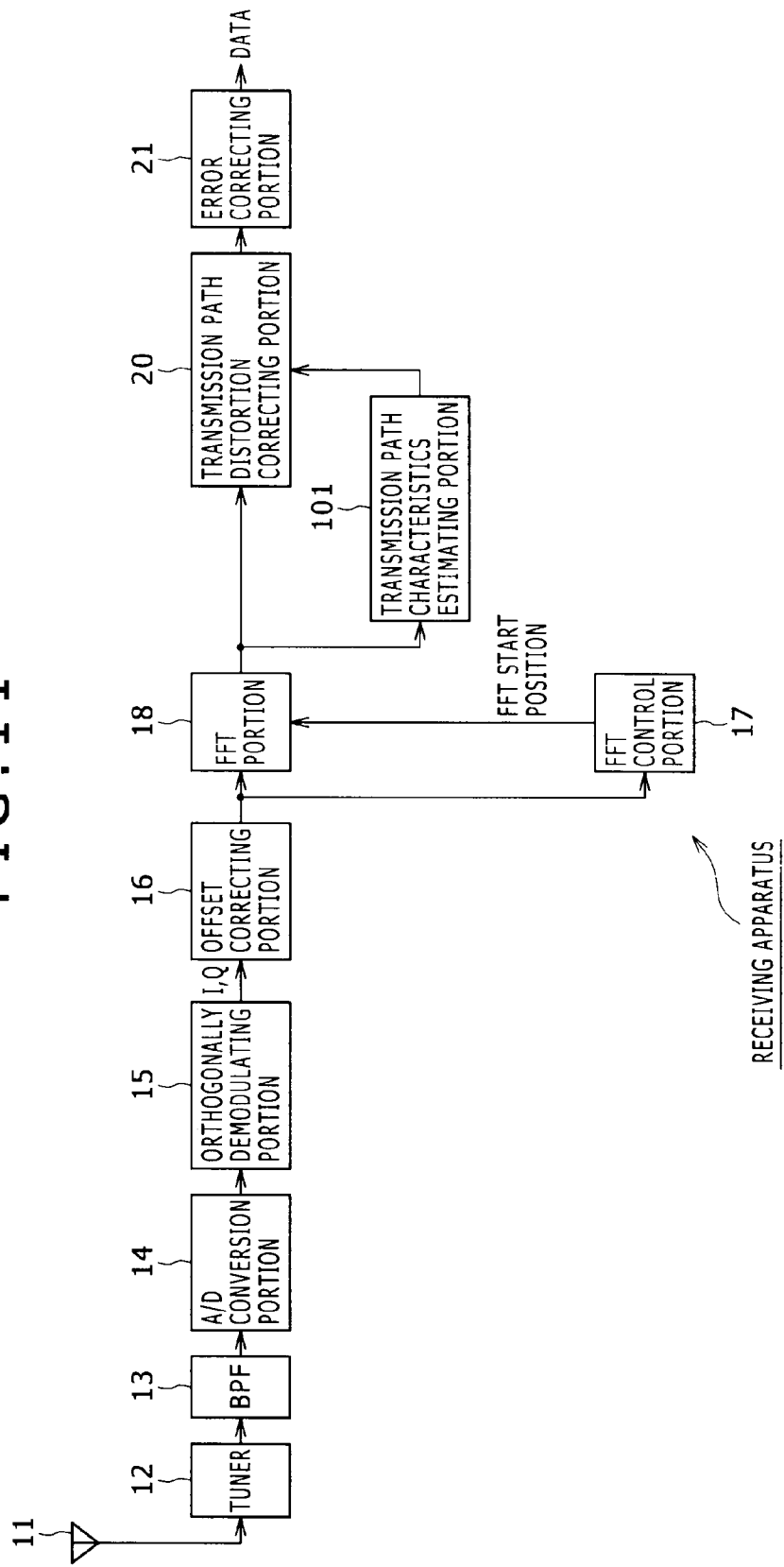
FIG. 11 is a block diagram showing a configuration of an embodiment of a receiving apparatus according to the present disclosure.

Embodiments of the present disclosure will be described in detail hereinafter with reference to the accompanying drawings Embodiment of Receiving Apparatus of the Present Disclosure FIG. 11 is a block diagram showing a configuration of an embodiment of a receiving apparatus according to the present disclosure.

Figure 3:
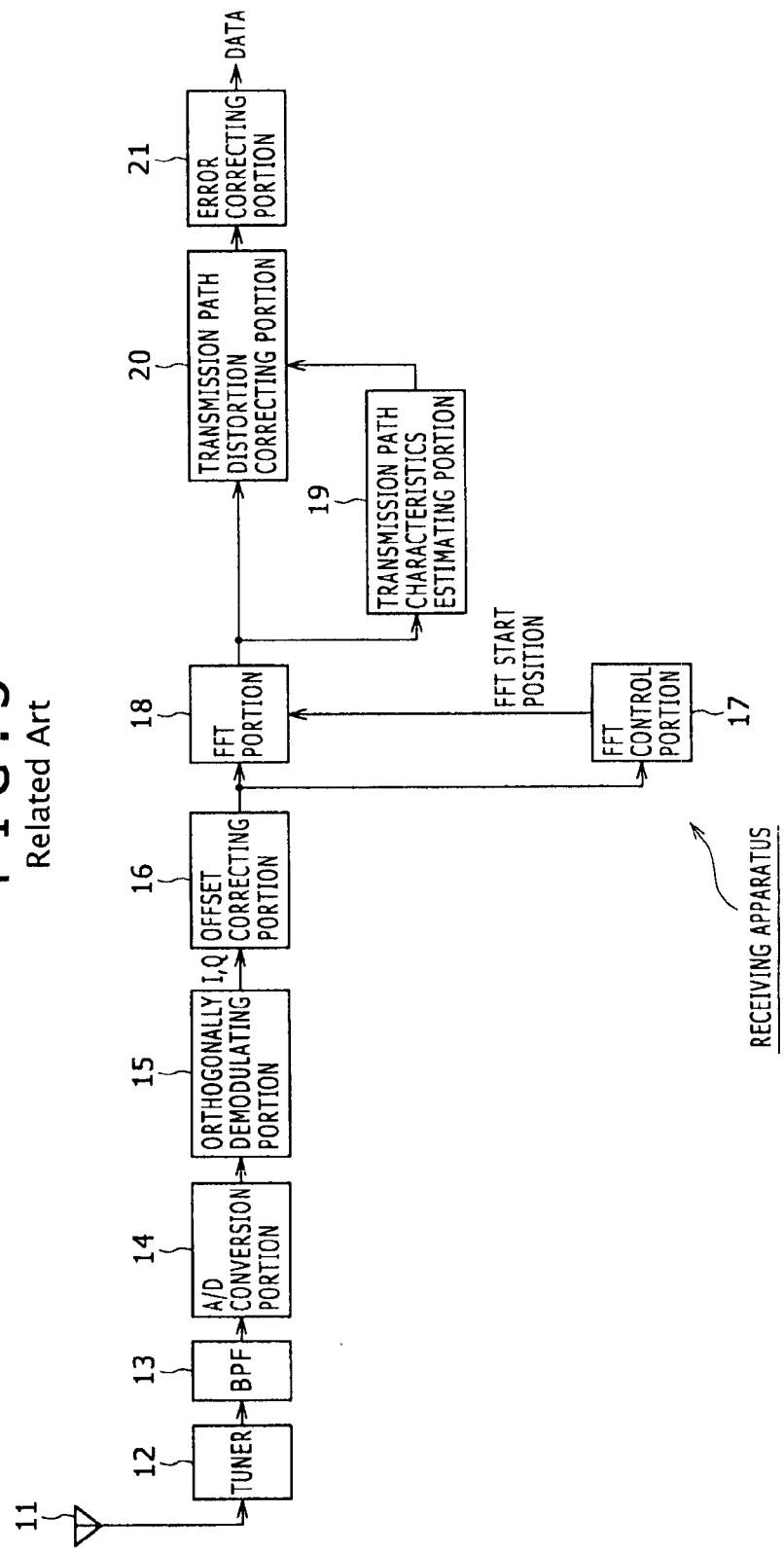
FIG. 3 is a block diagram showing a configuration of an example of an existing receiving apparatus for receiving the OFDM signal.

It is noted that in the figure, portions corresponding to those in the case of the existing receiving apparatus shown in FIG. 3 are designated by the same reference numerals, respectively, and a description thereof is suitably omitted below for the sake of simplicity.

The receiving apparatus shown in FIG. 11 is identical to the case of the existing receiving apparatus shown in FIG. 3 in that it includes the constituent elements from the antenna 11 to the FFT portion 18, the transmission path distortion correcting portion 20, and the error correcting portion 21.

However, the receiving apparatus shown in FIG. 11 is different from the case of the existing receiving apparatus shown in FIG. 3 in that a transmission path characteristics estimating section 101 is provided instead of providing the transmission path characteristics estimating section 19 shown in FIG. 3.

The OFDM frequency region signal is supplied from the FFT portion 18 to the transmission path characteristics estimating section 101.

The transmission path characteristics estimating section 101 estimates transmission path characteristics for the transmission symbols (sub-carriers) of the OFDM signal by using the P2 symbols (preamble symbols) and the data symbols which are all contained in the OFDM frequency region signal supplied thereto from the FFT portion 18. Also, the transmission path characteristics estimating section 101 supplies transmission path characteristics data as estimate values for the transmission path characteristics to the transmission path distortion correcting portion 20.

The transmission path distortion correcting portion 20 carries out the distortion correction for the OFDM frequency region signal supplied thereto from the FFT portion 18 by using the transmission path characteristic data supplied thereto from the transmission path characteristics estimating section 101. Also, the transmission path distortion correcting portion 20 supplies the OFDM frequency region signal obtained through the distortion correction to the error correcting portion 21.

Configuration of Transmission Path Characteristics Estimating Section 101

Figure 12:
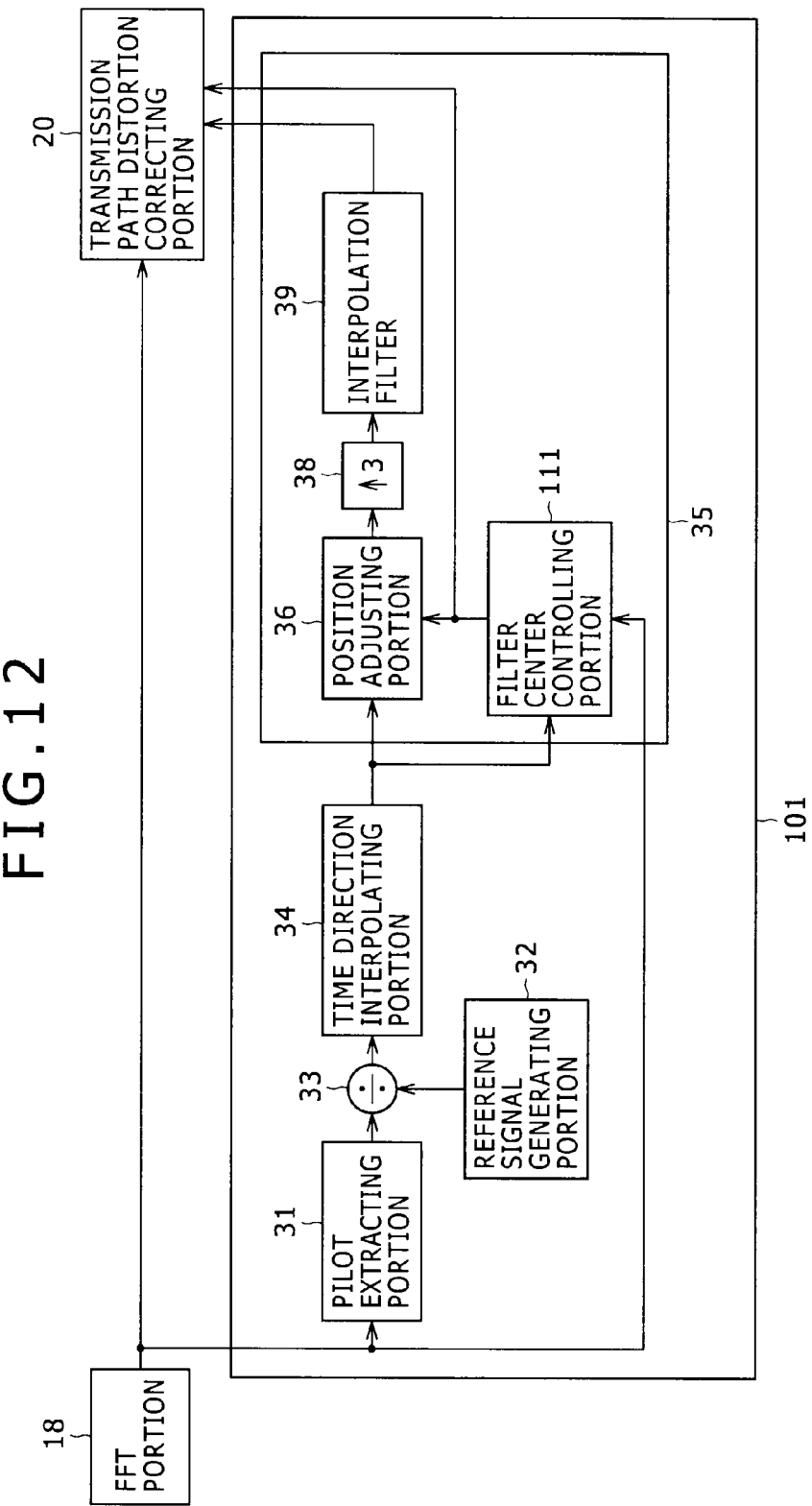
FIG. 12 is a block diagram showing a configuration of a transmission path characteristics estimating section.

FIG. 12 is a block diagram showing a configuration of the transmission path characteristics estimating section 101 shown in FIG. 11.

Figure 4:
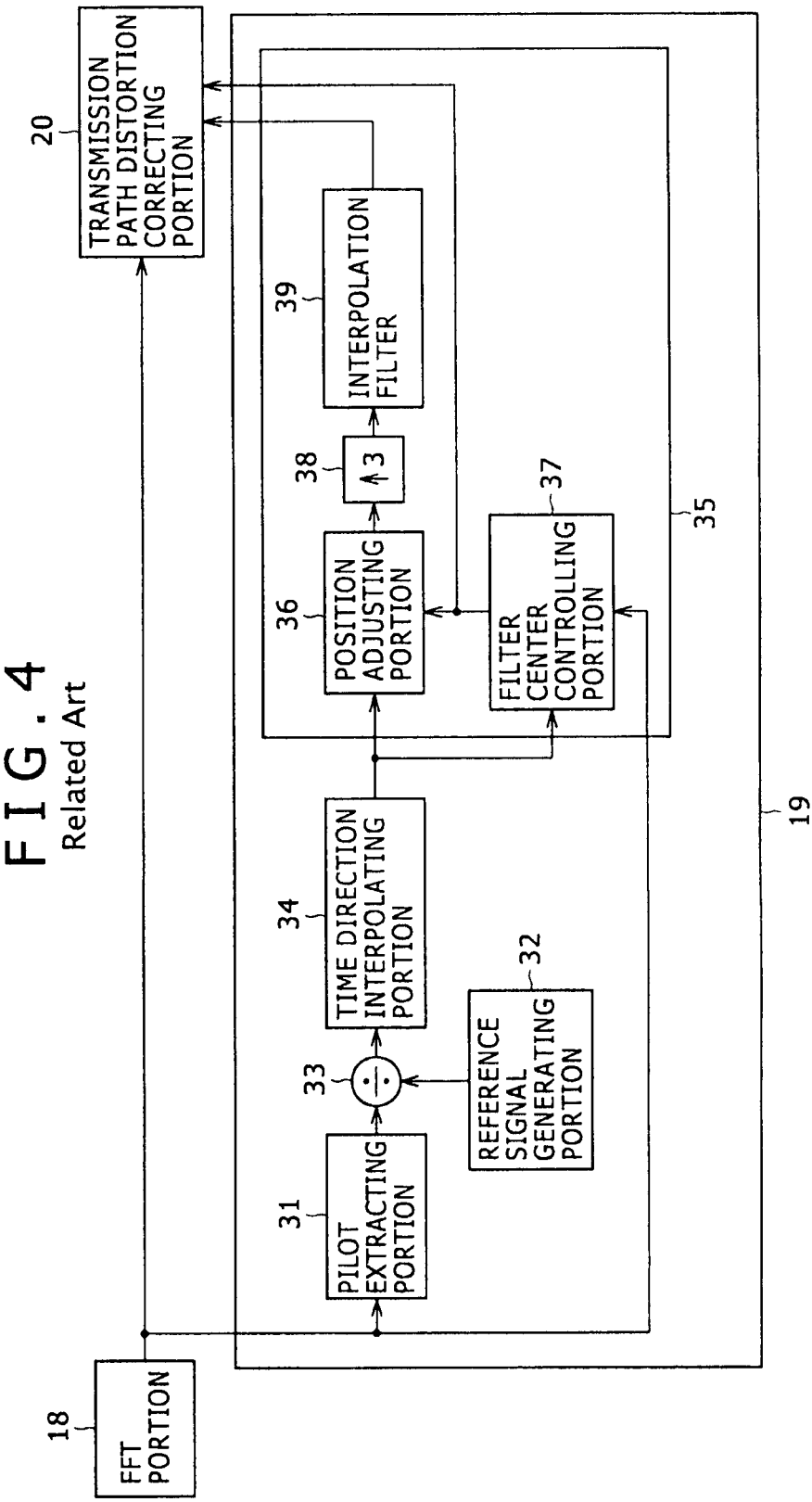
FIG. 4 is a block diagram showing an example of a configuration of a transmission path characteristics estimating section.
Figure 5:
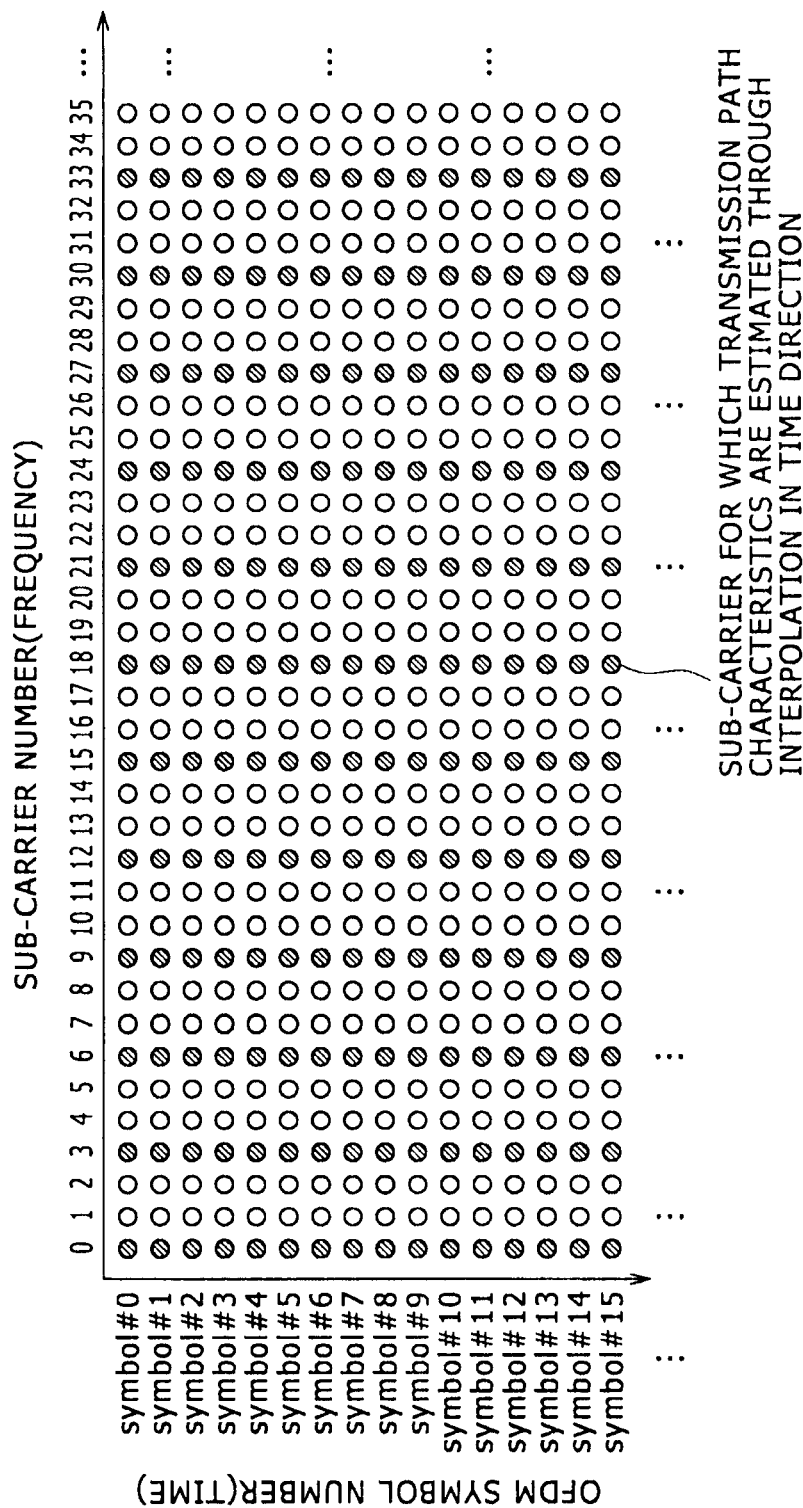
FIG. 5 is a diagram explaining time direction interpolation characteristic data as estimate values of the transmission path characteristics for which interpolation in a time direction is carried out.
Figure 6:
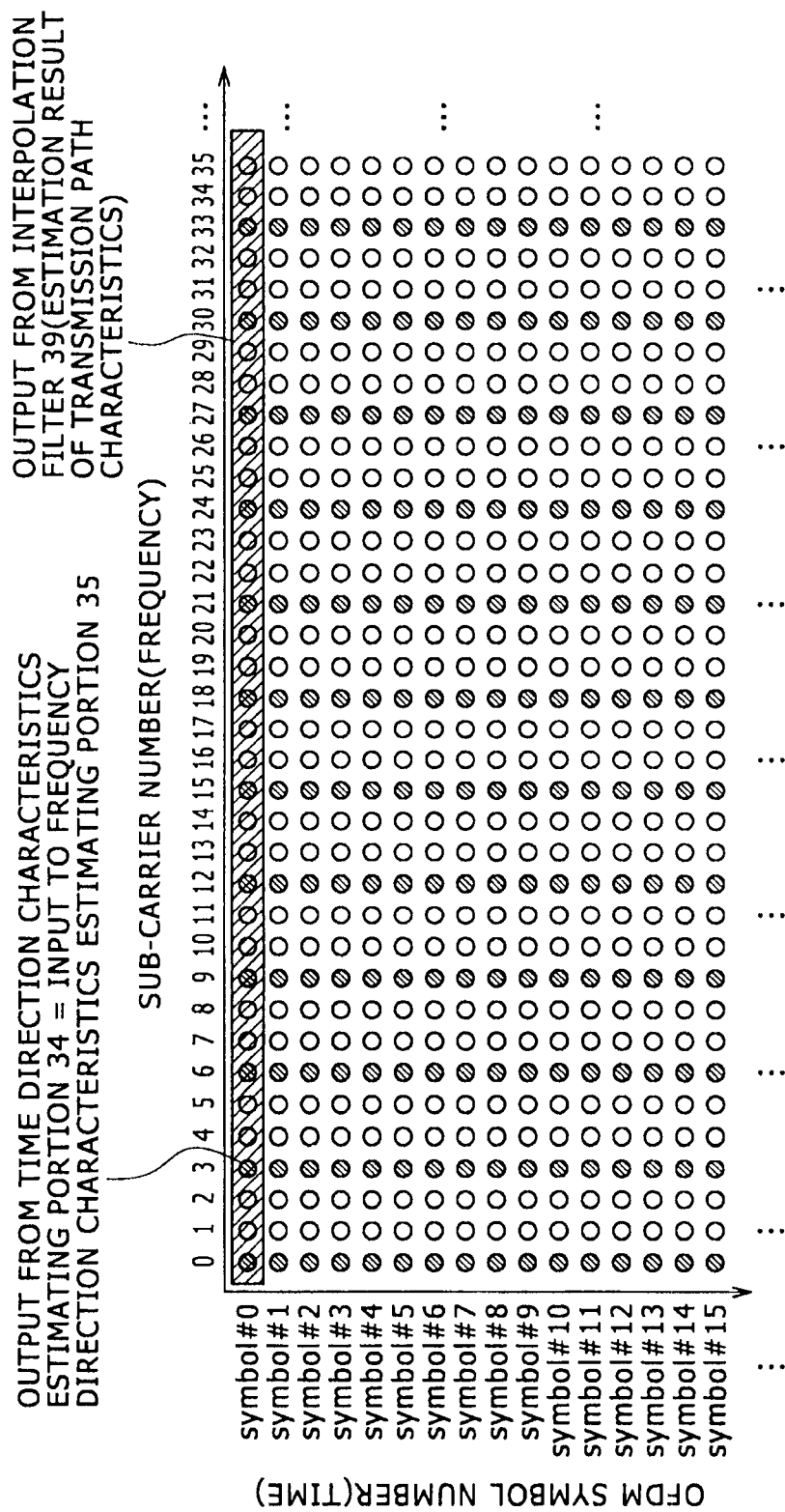
FIG. 6 is a diagram explaining frequency direction interpolation characteristic data as estimate values of the transmission path characteristics for which interpolation in a frequency direction is carried out.
Figure 7:
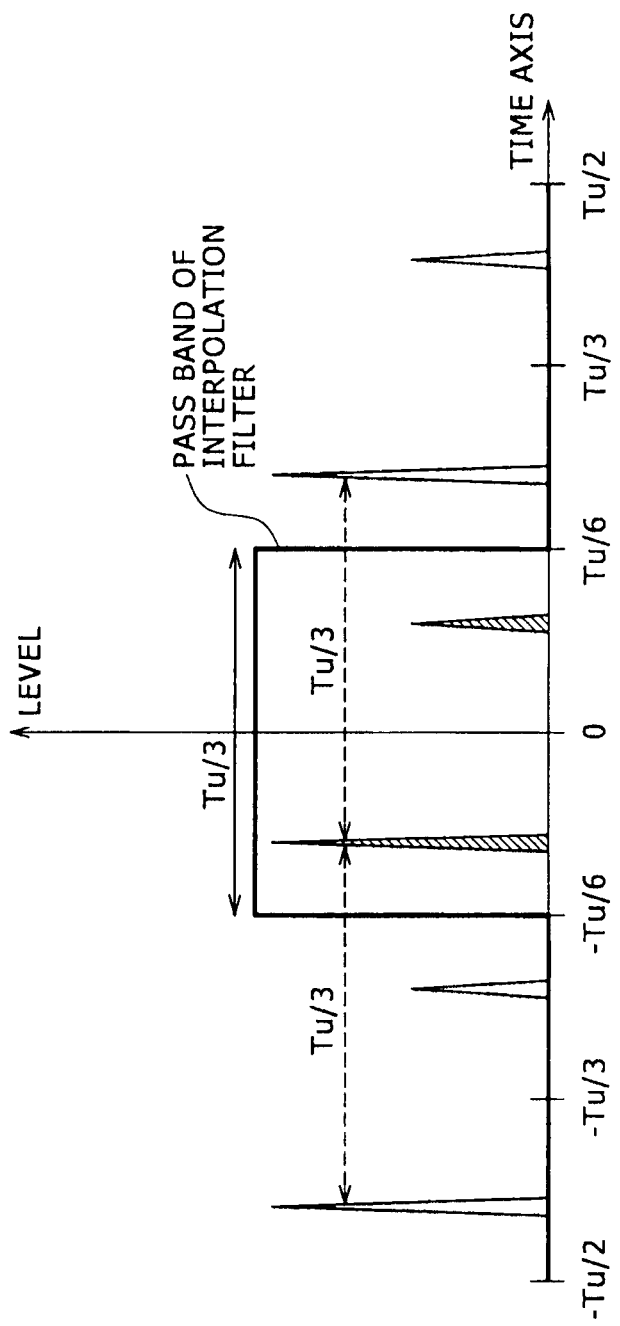
FIG. 7 is a graphical representation showing data in a time region of 0 value interpolation characteristic data.
Figure 8:
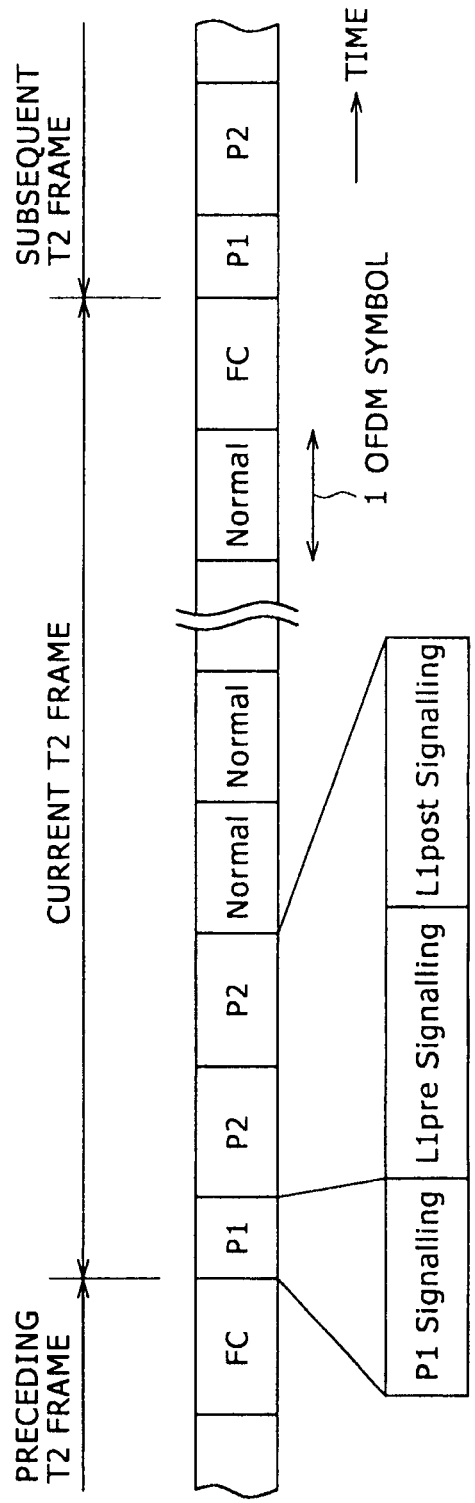
FIG. 8 is a diagram showing a format of a T2 frame.
Figure 9:
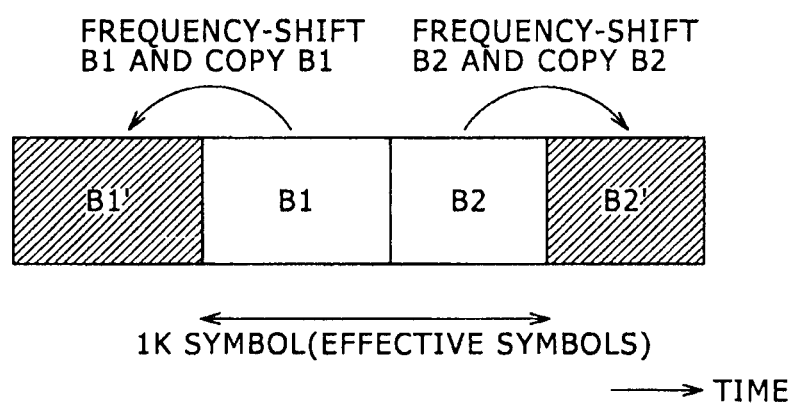
FIG. 9 is a diagram showing a structure of a P1 symbol.
Figure 10:
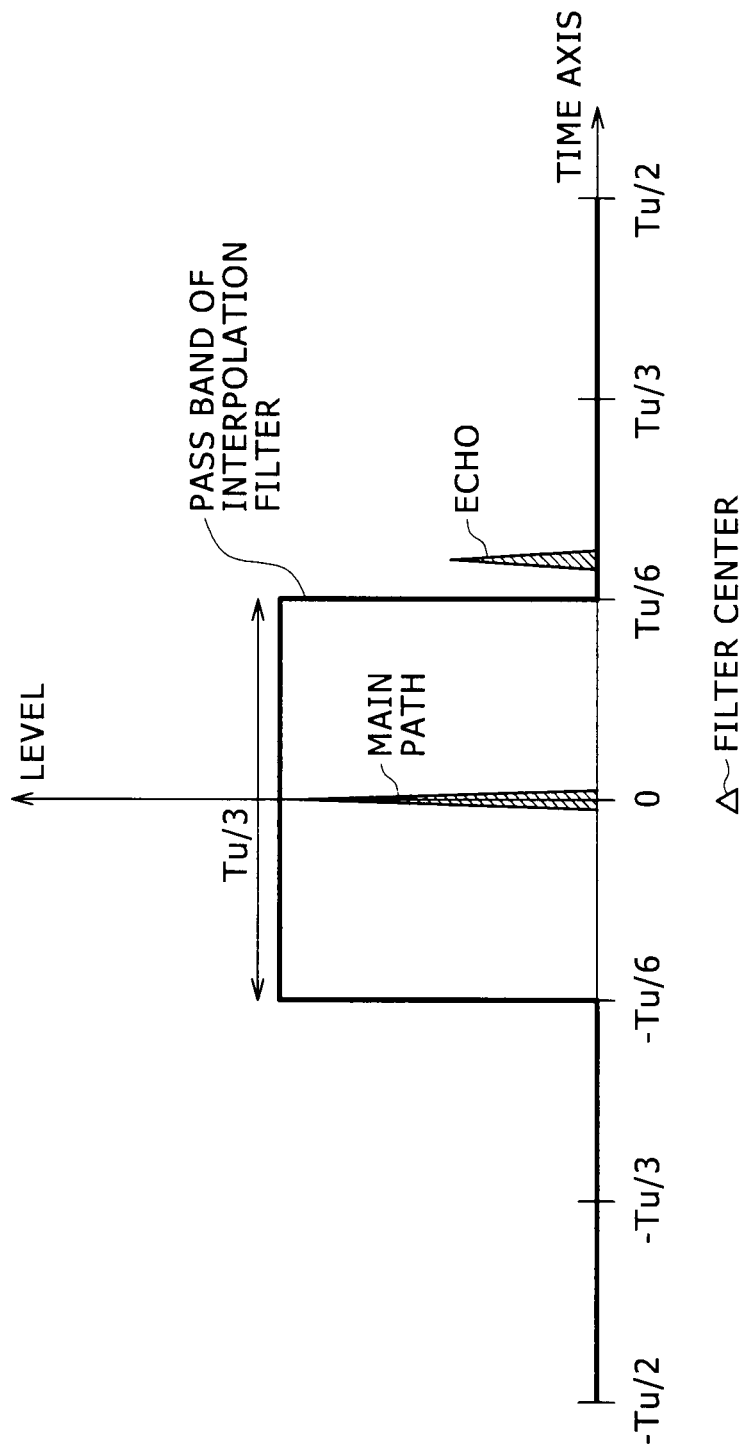
FIG. 10 is a graphical representation explaining filtering, of the 0 value interpolation characteristic data, which is carried out with a position of a filter center being fixed.

It is noted that in the figure, portions corresponding to those in the transmission path characteristics estimating section 19 shown in FIG. 4 are designated by the same reference numerals, respectively, and a description thereof is suitably omitted below for the sake of simplicity.

In FIG. 12, the transmission path characteristics estimating section 101 is identical to the transmission path characteristics estimating section 19 shown in FIG. 4 in that it includes the constituent elements from the pilot extracting portion 31 to the frequency direction interpolating part 35, and the frequency direction interpolating part 35 is provided with the position adjusting portion 36, the up-sampling portion 38, and the interpolation filter 39.

However, the transmission path characteristics estimating section 101 is different from the transmission path characteristics estimating section 19 shown in FIG. 4 in that a filter center controlling portion 111 is provided instead of providing the filter center controlling portion 37.

The time direction interpolation characteristic data is supplied from the time direction interpolating portion 34 to the filter center controlling portion 111, and the OFDM frequency region signal is supplied from the FFT portion 18 to the filter center controlling portion 111. The filter center controlling portion 111 carries out filter center position control by using the time direction interpolation characteristic data supplied thereto from the time direction interpolating portion 34, and the OFDM frequency region signal supplied thereto from the FFT portion 18.

That is to say, the filter center controlling portion 111 subjects the time direction interpolation characteristic data supplied thereto from the time direction interpolating portion 34 (the pre-interpolation transmission path characteristic data as the estimate values for the transmission path characteristics for which no interpolation in the frequency direction is carried out) to the same predetermined pieces of processing as that which the position adjusting portion 36, the up-sampling portion 38, and the interpolation filter 39 execute, respectively. Thereby, the filter center controlling portion 111 obtains transmission path characteristic data as estimate values for the transmission path characteristics for the transmission symbols of the OFDM frequency region signal.

Specifically, the filter center controlling portion 111 carries out the filtering for the time direction interpolation characteristic data (pre-interpolation transmission path characteristic data) supplied thereto from the time direction interpolating portion 34 by using an interpolation filter 54 (refer to FIG. 16) which will be described later while the position of the filter center is adjusted. Thereby, the filter center controlling portion 111 obtains the transmission path characteristic data as estimate values for the transmission path characteristics for the transmission symbols of the OFDM frequency region signal.

In addition, the filter center controlling portion 111 carries out the distortion correction for (the transmission symbols of) the OFDM frequency region signal supplied thereto from the FFT portion 18 by using the transmission path characteristic data similarly to the case of the transmission path distortion correcting portion 20. Thereby, the filter center controlling portion 111 obtains information on the signal quantity of the OFDM frequency region signal obtained through the distortion correction with a predetermined transmission symbol as an object.

As has been described, the filter center controlling portion 111 obtains the information on the signal quantity while the position of the filter center (of the interpolation filter (not shown)) is adjusted. Also, the filter center controlling portion 111 obtains information on the position of the filter center where the signal quality becomes best (becomes better) (hereinafter referred to as "the optimal position" as well).

Also, the filter center controlling portion 111 controls the position of the filter center of the interpolation filter 39 (the pass band of the interpolation filter 39) in such a way that the filter center of the interpolation filter 39 is made to agree with the optimal position.

That is to say, the filter center controlling portion 111 supplies the optimal position information representing the optimal position to the position adjusting portion 36.

As has been described, the position adjusting portion 36 adjusts a phase of the time direction interpolation characteristic data (pre-interpolation transmission path characteristic data) supplied thereto from the time direction interpolating portion 34 in accordance with the optimal position information supplied thereto from the filter center controlling portion 111, that is, rotates the time direction interpolation characteristic data on the IQ constellation. As a result, the position of the filter center in the phase of the filtering for the time direction interpolation characteristic data in the interpolation filter 39 in the subsequent stage is made to relatively agree with the position represented by the optimal position information.

The up-sampling portion 38 interpolates zeros the number of which is equal to the number of transmission symbols for which none of the estimate values for the transmission path characteristics is obtained in the frequency direction of the time direction interpolation characteristic data obtained through the adjustment of the phase of the time direction interpolation characteristic data carried out by the position adjusting portion 36 in the manner as described above. Also, the up-sampling portion 38 supplies the resulting 0 value interpolation characteristic data to the interpolation filter 39.

The interpolation filter 39 filters the 0 value interpolation characteristic data supplied thereto from the up-sampling portion 38.

The filtering carried out by the interpolation filter 39 results in removal of a repetitive component generated in the time direction interpolation characteristic data by the interpolation of zeros in the up-sampling portion 38. Thus, there is obtained frequency direction interpolation characteristic data as estimate values of the transmission path characteristics for which the interpolation in the frequency direction is carried out, that is, the transmission path characteristics for the transmission symbols (sub-carriers) of the OFDM symbols.

The frequency direction interpolation characteristic data which has been obtained in the interpolation filter 39 in the manner as described above is supplied in turn as transmission path characteristic data used for the distortion correction of the OFDM signal to the transmission path distortion correcting portion 20.

It is noted that although in FIG. 12, the filter center controlling portion 111 is provided inside the transmission path characteristics estimating section 101, alternatively, the filter center controlling portion 111 can be provided outside the transmission path characteristics estimating section 101.

Processing Executed in Receiving Apparatus

Figure 13:
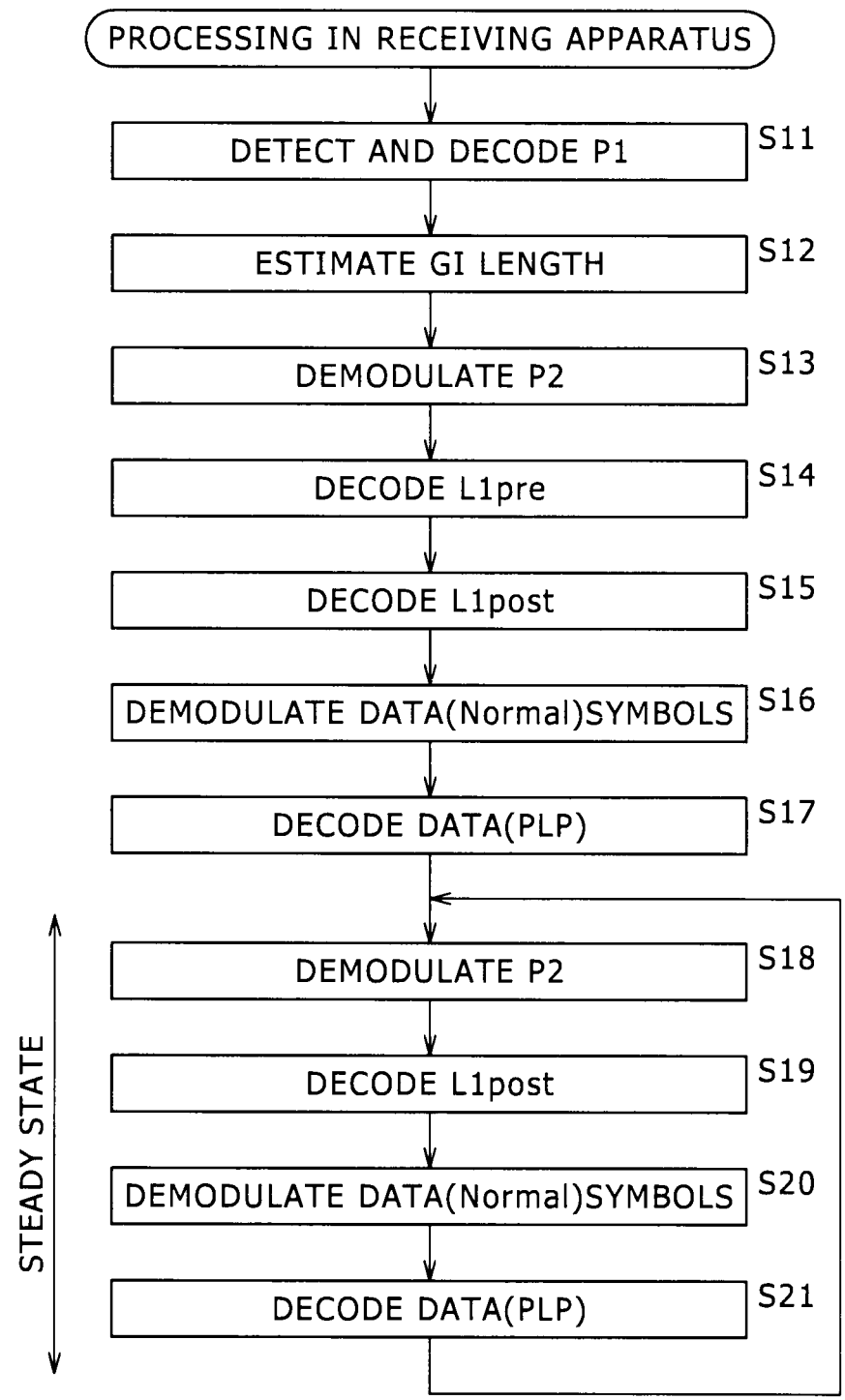
FIG. 13 is a flow chart explaining an outline of processing executed in the embodiment of the receiving apparatus according to the present disclosure.

FIG. 13 is a flow chart explaining an outline of processing which is executed in the receiving apparatus shown in FIG. 11.

When a power source is turned ON, or a predetermined channel (a program got up by a broadcasting station) is selected, the receiving apparatus starts to receive the T2 frame. Also, in Step S11, the receiving apparatus detects and decodes the P1 symbol of the T2 frame. Also, in Step S12, the receiving apparatus estimates the GI length.

In Step S13, the receiving apparatus demodulates the P2 symbols in accordance with the FFT size of the P2 symbols, the entire length of the P2 symbols contained in the T2 frame, and the like which are all recognized through the decoding of the P1 symbol, and the estimation of the GI length.

After completion of the demodulation of the P2 symbols, in Step S14, the receiving apparatus decodes the L1pre contained in the P2 symbols.

In addition, in Step S15, the receiving apparatus decodes the L1post contained in the P2 symbols in accordance with the information necessary for decoding of the L1post which is recognized through the decoding of the L1pre.

After that, in Step S16, the receiving apparatus demodulates the data symbols in accordance with the information necessary for the demodulation of the data symbols, and the decoding of the data (PLP) contained in the data symbols which are all recognized through the decoding of the L1pre and the L1post. In addition, in Step S17, the receiving apparatus decodes the data (and the FC) contained in the data symbols.

When the P2 symbols are demodulated, the L1 (consisting of the L1pre and the L1post) contained in the P2 symbols is decoded and the demodulation of the data symbols, and the decoding of the data contained in the data symbols are carried out in the manner as described above, processing in a steady state is executed for the subsequent T2 frame.

That is to say, the receiving apparatus receives the subsequent T2 frame, and demodulates the P2 symbols contained in the T2 frame in Step S18. Also, in Step S19, the receiving apparatus decodes the L1post contained in the P2 symbols.

Here, the information, necessary for the decoding of the data, on a position and a size of the data (PLP), and the like is contained in the L1post. However, since the position and size of the data (PLP) are changed every T2 frame in some cases, the L1post is decoded every T2 frame.

After that, in Step S20, the receiving apparatus demodulates the data symbols contained in the T2 frame (the T2 frame obtained by decoding the L1post in Step S19 right before Step S20) in accordance with the information contained in the L1post which has been decoded in Step S19 right before Step S20. Also, in Step S21, the receiving apparatus decodes the data contained in the data symbols.

Also, when the receiving apparatus further receives the subsequent T2 frame, the operation of the receiving apparatus returns from the processing in Step S21 back to the processing in Step S18, and the same processing in the steady state will be repetitively executed below.

Arrangement of Pilot Signals of Data Symbols

Figure 14:
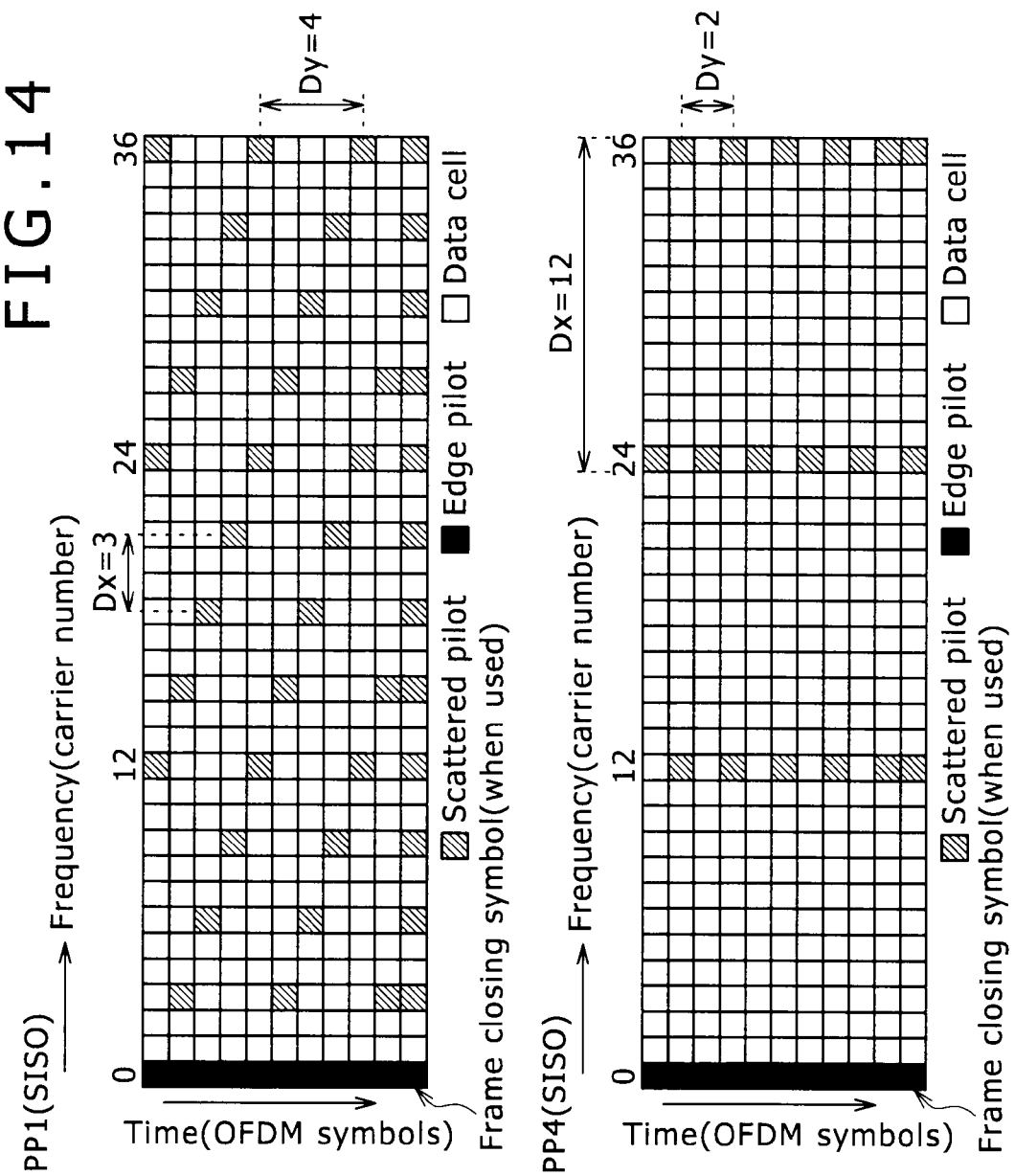
FIG. 14 is a diagram showing an arrangement pattern of pilot signals (SPs) of data symbols complying with a DVB-T.2.

FIG. 14 is a diagram showing an arrangement pattern of the pilot signals (SPs) of the data symbols complying with the DVB-T.2.

Figure 1:
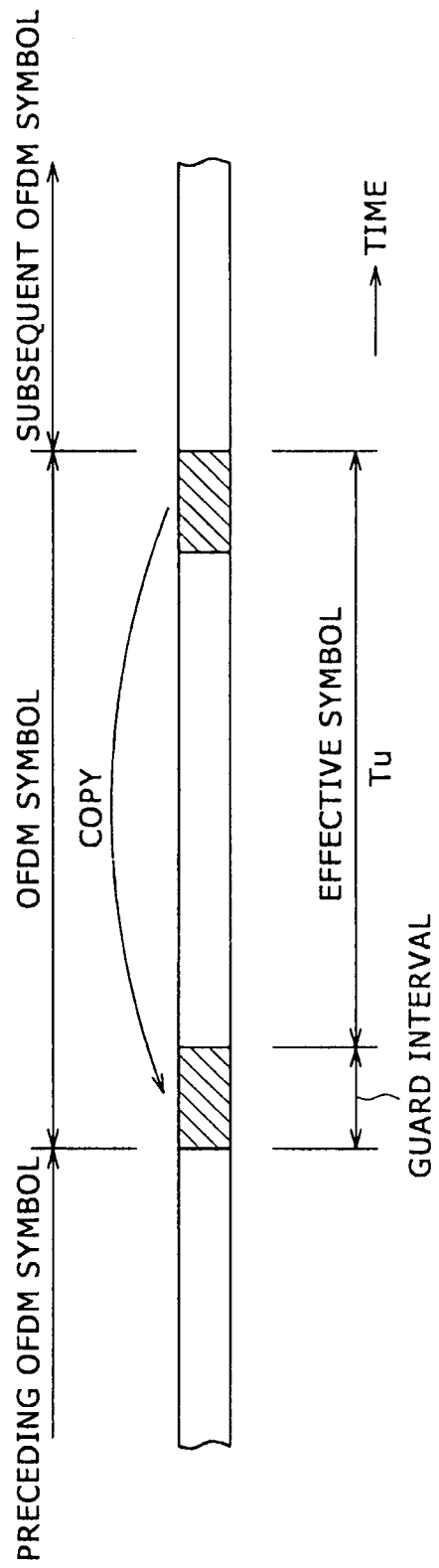
FIG. 1 is a diagram showing an OFDM symbol.
Figure 2:
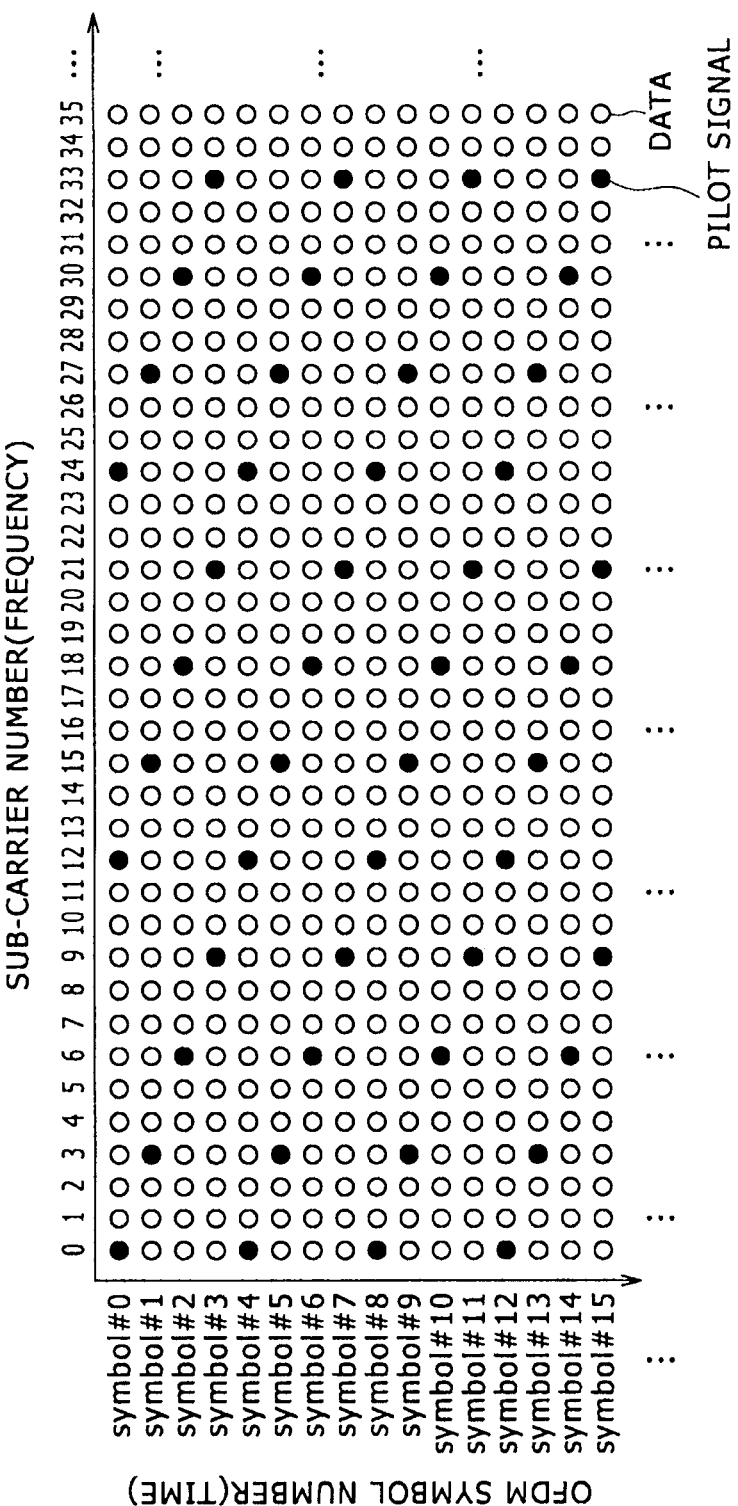
FIG. 2 is a diagram showing an example of an arrangement pattern of pilot signals within the OFDM symbols.

It is noted that as described with reference to FIG. 2, in FIG. 14, an axis of abscissa represents a frequency (sub-carrier number), and an axis of ordinate represents time (OFDM symbol number).

In the DVB-T.2, unlike the DVB-T and the ISDB-T, only one pilot pattern is not determined as the pilot pattern as the arrangement pattern of the SPs, but eight kinds of pilot patterns PP1 to PP8 are determined.

FIG. 14 shows the data symbols of the pilot patterns PP1 and PP4.

In FIG. 14, a rectangle represents the transmission symbol, and an outlined rectangle represents the transmission symbol (Data cell) of the data. In addition, a shaded rectangle represents (the transmission symbol of) the SP, and a black rectangle represents (a transmission symbol of) an Edge pilot.

In the pilot pattern PP1, an interval, Dx, of the frequencies in which the SPs exist (the interval of the columns) is set to 3, an interval, Dy, of the times between the SPs in the frequency (column) in which the SP exists is set to 4, and an interval, Dx×Dy, of the SPs in the frequency direction is set to 12.

In addition, in the pilot pattern PP4, an interval, Dx, of the frequencies in which the SPs exist (the interval of the columns) is set to 12, an interval, Dy, of the times between the SPs in the frequency (column) in which the SP exists is set to 2, and an interval, Dx×Dy, of the SPs in the frequency direction is set to 24.

(The information on) The pilot pattern of the data symbols is contained in the L1pre. Therefore, the filter center position control using the data symbols cannot be carried out until the P2 symbols are demodulated and the L1pre contained in the P2 symbols is encoded.

Arrangement of P2 Pilot Signals

Figure 15:
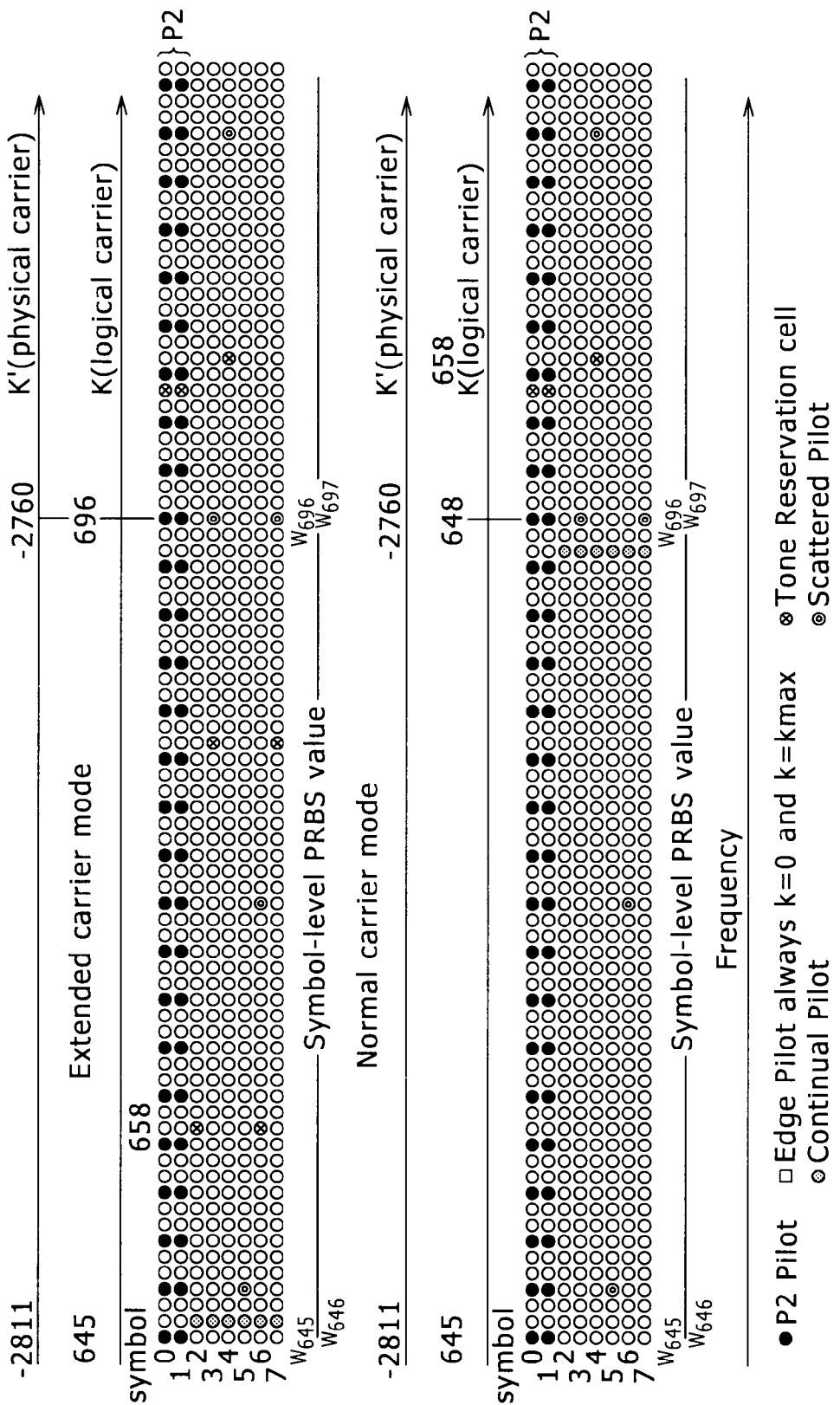
FIG. 15 is a diagram showing an arrangement pattern of pilot signals (P2 pilot signals) contained in P2 symbols complying with the DVB-T.2.

FIG. 15 is a diagram showing an arrangement pattern of the pilot signals (P2 pilot signals) contained in the P2 symbols complying with the DVB-T.2.

Note that, in the DVB-T.2, the transmission band with which the OFDM signal is transmitted can be extended. In FIG. 15, an Extended carrier mode is a mode in which the transmission band is extended, and a Normal carrier mode is a mode in which the transmission band is not extended.

In addition, in FIG. 15, a physical carrier number k' is a sub-carrier number when the sub-carrier number of the sub-carrier at the center of the OFDM symbol is set to zero. Also, a logical carrier number k is a carrier number when the sub-carrier number of the sub-carrier on the extreme left of the OFDM symbol (the sub-carrier having the lowest frequency) is set to zero.

In addition, although not illustrated in FIG. 15, the leftmost and rightmost transmission symbols (sub-carriers) are the transmission symbols of the edge pilot signals, respectively.

In addition, in FIG. 15, the FFT size of each of the P2 symbols is 8K. For this reason, the two P2 symbols are arranged in the T2 frame.

That is to say, in FIG. 15, the first and second two OFDM symbols from the top are each P2 symbols following the P1 symbol in the T2 frame. Also, the OFDM symbols in and after the third OFDM symbol are the data symbols each following the P2 symbols, respectively, in the T2 frame.

Also, in addition to the P2 pilot signals contained in the P2 symbols, respectively, Scattered Pilots (SPs) and Continual Pilots (CPs) which are both contained in the data symbols are also illustrated in FIG. 15.

In addition, in FIG. 15, a Tone Reservation Cell means the transmission symbol in which a value by which a Peak to Average Power Ratio (PAPR) is reduced is set.

That is to say, when there is the biasing in the values of the transmission symbols of the OFDM symbols, a large peak occurs in the OFDM time region signal obtained by the IFFT for the OFDM signal in the receiving apparatus. The peak is clipped either in the transmitting apparatus or in the receiving apparatus, thereby deteriorating the reception performance of the OFDM signal.

The value by which such a peak is reduced is set in the tone reservation cell.

In the DVB-T.2, the P2 pilot signals of the P2 symbols are periodically arranged at the same frequency of the OFDM symbols (P2 symbols).

However, in the DVB-T.2, the period, Dx, of the arrangement of the P2 pilot signals depends on the FFT size of the P2 symbol. Thus, when the FFT size is 32K, the period, Dx, is 6, and when the FFT size is 16K or less, the period, Dx, is 3.

In FIG. 15, as has been described above, the FFT size of the P2 symbol is 8K, and therefore, the period, Dx, of the arrangement of the P2 pilot signals becomes 3.

It is noted that the P2 pilot signals are arranged in the time direction without leaving a space.

Since the P2 pilot signals are contained in the P2 symbol, it is possible to estimate the transmission path characteristics by using the P2 pilot signals.

However, since neither the transmission symbol of the TMCC/AC complying with the ISDB-T nor the transmission symbol the TPS complying with the DVB-T exists in any of the P2 symbols, it may be impossible to obtain the signal quality of the OFDM frequency region signal after completion of the distortion correction with the transmission symbol of the TMCC/AC or the transmission symbol of the TPS as an object. Therefore, it may also be impossible to carry out the filter center position control for enhancing the signal quality.

Then, the filter center controlling portion 111 shown in FIG. 12 carries out the filter center position control for obtaining the signal quality of the OFDM frequency region signal after completion of the distortion correction with the transmission symbol of the L1pre as an object, and enhancing the signal quality.

Configuration of Filter Center Controlling Portion 111

Figure 16:
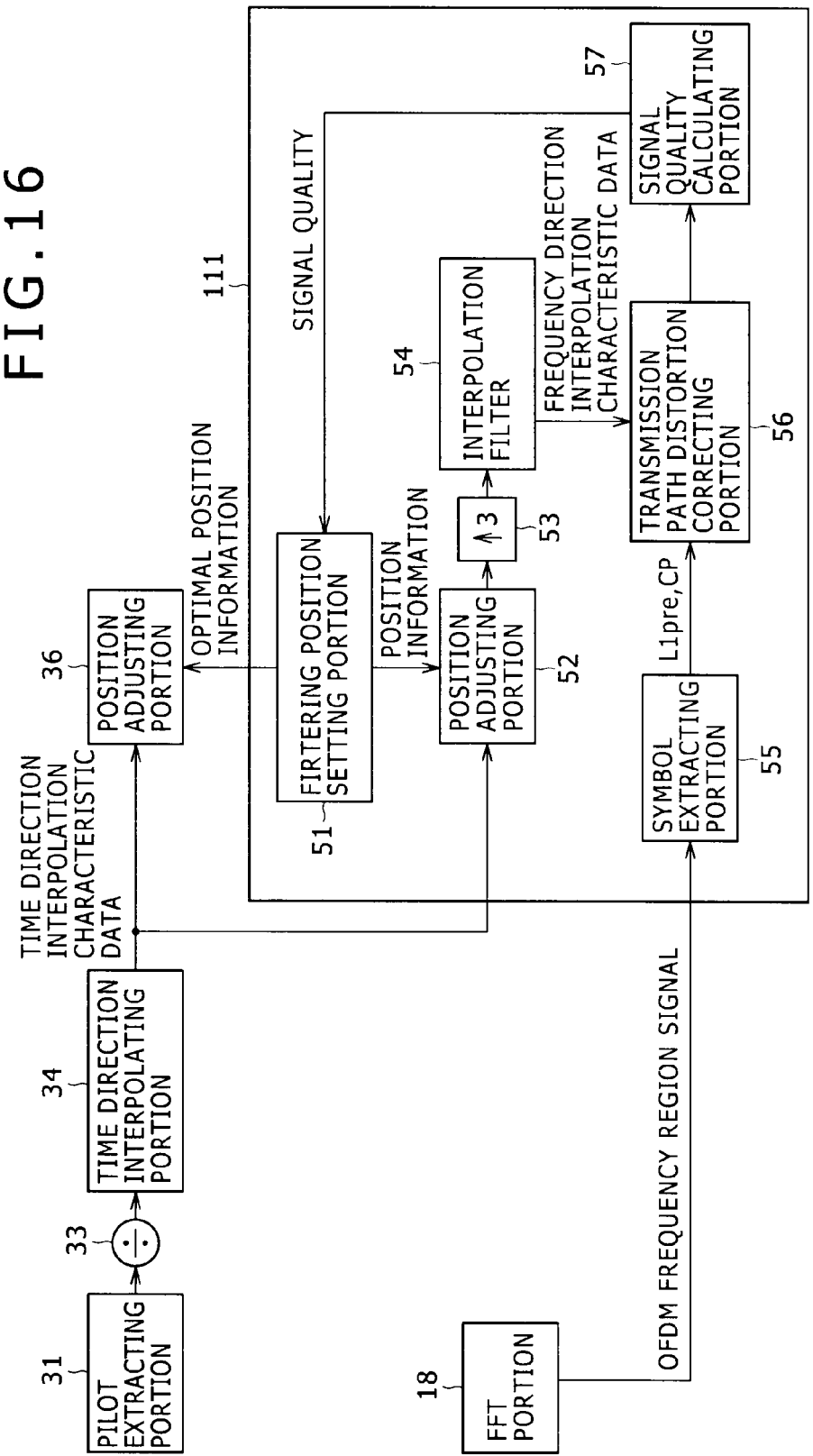
FIG. 16 is a block diagram showing a configuration of a filter center controlling portion.

FIG. 16 is a block diagram showing a configuration of the filter center controlling portion 111 shown in FIG. 12.

The filter center controlling portion 111 carries out the filter center portion control in such a way that until the demodulation of the P2 symbols and the decoding of the L1pre contained in the P2 symbols are carried out, and (the information on) the pilot pattern of the data symbols is acquired, the signal quality of the OFDM frequency region signal after completion of the distortion correction is made best by using the transmission symbols of the P2 symbols.

Also, after the L1pre has been decoded to acquire the information on the pilot pattern contained in the L1pre, the filter center controlling portion 111 carries out the filter center position control in such a way that the signal quality of the OFDM frequency region signal after completion of the distortion correction is made best by using the transmission symbols of the data symbols in which the transmission symbols of the SPs are arranged in accordance with that pilot pattern.

Here, the filter center position control using (the transmission symbols of) the P2 symbols is referred to as "the filter center position control in a capturing mode" as well. Also, the filter center position control using (the transmission symbols of) the data symbols is referred to as "the filter center position control in a following mode" as well.

The filter center controlling portion 111, as shown in FIG. 16, includes a filtering position setting portion 51, a position adjusting portion 52, an up-sampling portion 53, an interpolation filter 54, a symbol extracting portion 55, a transmission path distortion correcting portion 56, and a signal quality calculating portion 57.

In the filter center controlling portion 111, the OFDM frequency region signal supplied from the FFT portion 18 to the symbol extracting portion 55. Also, the time direction interpolation characteristic data (pre-interpolation transmission path characteristic data) is supplied from the time direction interpolating portion 34 to the position adjusting portion 52.

Here, with regard to the P2 symbols, the pilot extracting portion 31 (refer to FIG. 12) extracts (the transmission symbols of) the P2 pilot signals. Also, with regard to the data symbols, the pilot extracting portion 31 extracts (the transmission symbols of) the SPs.

The position of the P2 pilot signals of the P2 symbols are specified from the FFT sizes of the P2 symbols which are recognized from the bits S1 and S2 contained in the P1 symbol after the detection and decoding of the P1 symbol have been carried out.

Therefore, after the power source of the receiving apparatus has been turned ON (or the predetermined channel (the program got up by the broadcasting station) has been selected), the detection and decoding of the P1 symbol are carried out to recognize the FFT sizes of the P2 symbols, thereby specifying the positions of the P2 pilot signals. After that, the pilot extracting portion 31 can extract the P2 pilot signals.

In addition, the positions of the SPs of the data symbols are specified from the pilot pattern which is recognized from the L1pre after the detection and decoding of the P1 symbols, the demodulation of the P2 symbols, and the decoding of the L1pre have been carried out.

Therefore, the detection and decoding of the P1 symbols, the demodulation of the P2 symbols, and the decoding of the L1pre are carried out after the power source of the receiving apparatus has been turned ON, and thereby the pilot pattern of the data symbols is recognized to specify the positions of the SPs of the data symbols. After that, the pilot extracting portion 31 can extract the SPs.

The transmission symbols of the pilot signals (the P2 pilot signals of the P2 symbols, and the SPs of the data symbols) extracted by the pilot extracting portion 31 are supplied to the estimating portion 33 (refer to FIG. 12).

The estimating portion 33 estimates the transmission path characteristics for the transmission symbols in the manner as described above by using the transmission symbols of the pilot signals supplied thereto from the pilot extracting portion 31. Also, the estimating portion 33 supplies the transmission path characteristic data as the estimate values of the transmission path characteristics to the time direction interpolating portion 34.

Here, the SPs of the data symbols, as shown in FIG. 14, are arranged with a space being left in the time direction.

For this reason, when the transmission path characteristic data supplied from the estimating portion 33 is the estimate values for the transmission path characteristics for the transmission symbols of the SPs of the data symbols, the time direction interpolating portion 34 interpolates the transmission path characteristic data supplied thereto from the estimating portion 33 in the time direction. Also, the time direction interpolating portion 34 outputs the resulting data after completion of the interpolation in the time direction as the time direction interpolation characteristic data.

On the other hand, the P2 pilot signals of the P2 symbols, as shown in FIG. 15, are arranged in the time direction without leaving the space (or, with regard to the OFDM symbols as the P2 symbols, only one OFDM symbol exists in the T2 frame). Therefore, it is unnecessary to carry out the interpolation in the time direction for the transmission path characteristic data estimated from such P2 pilot signals.

For this reason, when the transmission path characteristic data supplied from the estimating portion 33 is the estimate values for the transmission path characteristics for the transmission symbols of the P2 pilot signals of the P2 symbols, the time direction interpolating portion 34 outputs the transmission path characteristic data supplied thereto from the estimating portion 33 as it is.

As has been described, the time direction interpolating portion 34 shows the case where it interpolates the transmission path characteristic data supplied thereto from the estimating portion 33 in the time direction, thereby outputting the data after completion of the interpolation, and the case where it outputs the transmission path characteristic data as it is without interpolating the transmission path characteristic data supplied thereto from the estimating portion 33 in the time direction. However, in any case, since the data outputted from the time direction interpolating portion 34 becomes an object for the interpolation in the frequency direction, hereinafter, the data concerned will be referred to as "the pre-interpolation transmission path characteristic data" as well.

The pre-interpolation transmission path characteristic data as described above which has been outputted from the time direction interpolating portion 34 is supplied to the position adjusting portion 52.

The filtering position setting portion 51 sets the filtering position, as the position on the pre-interpolation transmission path characteristic data, with which the filter center (the center of the pass band) of the interpolation filter 54 is made to agree. Also, the filtering position setting portion 51 supplies position information representing the filtering position to the position adjusting portion 52.

The filtering position setting portion 51 sets plural filtering positions, and stores information on the plural filtering positions and the information on the signal qualities supplied thereto from the signal quality calculating portion 57 in such a way that the plural filtering positions and the signal qualities are made to correspond to each other for the filtering positions.

Also, the filtering position setting portion 51 obtains an optimal position as the filtering position where the signal quality becomes best, and supplies the optimal position information representing the optimal position to the position adjusting portion 36, thereby (relatively) controlling the position of the filter center of the interpolation filter 39 (refer to FIG. 12).

The position adjusting portion 52, the up-sampling portion 53, and the interpolation filter 54 execute the same predetermined pieces of processing as those executed in the position adjusting portion 36, the up-sampling portion 38, and the interpolation filter 39 shown in FIG. 12, respectively.

That is to say, the position adjusting portion 52 adjusts the phase of the pre-interpolation transmission path characteristic data supplied thereto from the time direction interpolation portion 34 in accordance with the position information from the filtering position setting portion 51. Also, the position adjusting portion 52 supplies the pre-interpolation transmission path characteristic data obtained through the adjustment for the phase of the pre-interpolation transmission path characteristic data to the up-sampling portion 53.

Here, in the position adjusting portion 52, similarly to the case of the position adjusting portion 36 shown in FIG. 12, the pre-interpolation transmission path characteristic data supplied from the time direction interpolating portion 34 is rotated on the IQ constellation in accordance with the position information supplied from the filtering position setting portion 51. As a result, the position of the filter center in the phase of the filtering for the pre-interpolation transmission path characteristic data in the interpolation filter 54 is made to relatively agree with the filtering position represented by the position information.

Similarly to the case of the up-sampling portion 38 shown in FIG. 12, the up-sampling portion 53 interpolates zeros the number of which is equal to the number of transmission symbols for which the none of the estimate values for the transmission path characteristics is obtained when viewed in the frequency direction between the sample values of the pre-interpolation path characteristic data supplied thereto from the position adjusting portion 52. Also, the up-sampling portion 53 supplies the 0 value interpolation characteristic data obtained through the interpolation to the interpolation filter 54.

Here, when the pre-interpolation transmission path characteristic data supplied from the position adjusting portion 52 to the up-sampling portion 53, for example, is the estimate values for the transmission path characteristics obtained from the SPs of the data symbols of the pilot pattern PP1 shown in FIG. 14, the number, Dx−1, of transmission symbols for which none of the estimate values for the transmission path characteristics is obtained is two when viewed in the frequency direction. Therefore, two zeros are interpolated in the up-sampling portion 53.

In addition, when the pre-interpolation transmission path characteristic data supplied from the position adjusting portion 52 to the up-sampling portion 53, for example, is the estimate values for the transmission path characteristics obtained from the SPs of the data symbols of the pilot pattern PP4 shown in FIG. 14, the number, Dx−1, of transmission symbols for which none of the estimate values of the transmission path characteristics is obtained is eleven when viewed in the frequency direction. Therefore, eleven zeros are interpolated in the up-sampling portion 53.

Moreover, when the pre-interpolation transmission path characteristic data supplied from the position adjusting portion 52 to the up-sampling portion 53, for example, is the estimate values for the transmission path characteristics obtained from the P2 pilot signals of the P2 symbols having the FFT size of 8K shown in FIG. 15, the number, Dx−1, of transmission symbols for which none of the estimate values of the transmission path characteristics is obtained is two when viewed in the frequency direction. Therefore, two zeros are interpolated in the up-sampling portion 53.

The interpolation filter 54 is an LPF similar to the case of the interpolation filter 39 shown in FIG. 12, and thus filters the 0 value interpolation characteristic data supplied thereto from the up-sampling portion 53.

The filtering carried out by the interpolation filter 54 results in removal of a repetitive component generated in the pre-interpolation transmission path characteristic data (in the 0 value interpolation characteristic data obtained by interpolating the zero values) by the interpolation of zeros in the up-sampling portion 53. Thus, there is obtained frequency direction interpolation characteristic data as estimate values of the transmission path characteristics for which the interpolation in the frequency direction has been carried out, that is, the transmission path characteristics for the transmission symbols (sub-carriers) of the OFDM symbols.

The frequency direction interpolation characteristic data which has been obtained in the interpolation filter 54 in the manner as described above is supplied in turn as transmission path characteristic data used for the distortion correction of the OFDM signal to the transmission path distortion correcting portion 56.

The symbol extracting portion 55 extracts the transmission symbol becoming an object of the calculation of the signal quality in the signal quality calculating portion 57 (hereinafter referred to as "an object symbol" as well). Also, the symbol extracting portion 55 supplies the transmission symbol thus extracted to the transmission path distortion correcting portion 56.

Here, in the capturing mode in which the filter center position control using the P2 symbols is carried out, the symbol extracting portion 55 extracts the transmission symbols of the L1pre contained in the P2 symbols as the OFDM frequency region signals supplied from the FFT portion 18 as the object symbol.

The transmission symbols of the L1pre are arranged in the form of being filled on the head side of the P2 symbols. Also, frequency interleave (interleave for exchanging the position for another one in the frequency direction) is carried out for the transmission symbols of the L1pre.

The exchanging method for the transmission symbols in the frequency interleave is determined in the DVB-T.2. Thus, the positions of the transmission symbols of the L1pre in the P2 symbols can be specified in accordance with the exchanging method.

The symbol extracting portion 55 specifies the positions of the transmission symbols of the L1pre in the P2 symbols in accordance with the exchanging method for the transmission symbols in the frequency interleave. Also, the symbol extracting portion 55 extracts the transmission symbol of the L1pre as the object symbol from the P2 symbols.

In addition, in the following mode in which the filter center position control using the data symbols is carried out, the symbol extracting portion 55 extracts the transmission symbol of the CP contained in the data symbols as the OFDM frequency region signals from the FFT portion 18 as the object symbol.

The transmission symbol of the CP is one having the specific frequency previously determined in the data symbols. Therefore, the symbol extracting portion 55 extracts the transmission symbol of the CP as the transmission symbol having the specific frequency as the object symbol from the data symbols.

The transmission path distortion correcting portion 56 carries out the distortion correction for the OFDM frequency region signal of the object symbol supplied thereto from the symbol extracting portion 55 similarly to the case of the transmission path distortion correcting portion 20 shown in FIG. 12.

That is to say, the transmission path distortion correcting portion 56 carries out the distortion correction for the object symbol by dividing the OFDM frequency region signal of the object symbol supplied thereto from the symbol extracting portion 55 by the transmission path characteristic data supplied thereto from the interpolation filter 54. Also, the transmission path distortion correcting portion 56 supplies the OFDM frequency region signal after completion of the distortion correction for the object symbol to the signal quality calculating portion 57.

It is noted that the position information is also supplied from the filtering position setting portion 51 to the transmission path distortion correcting portion 56. In the transmission path distortion correcting portion 56, similarly to the case of the transmission path distortion correcting portion 20 shown in FIG. 12, the phase of the OFDM frequency region signal of the object symbol supplied from the symbol extracting portion 55 is adjusted (rotated) in accordance with the position information supplied from the transmission path distortion correcting portion 56. After that, the distortion correction for the OFDM frequency region signal is carried out by dividing the OFDM frequency region signal by the transmission path characteristic data supplied from the transmission path characteristics estimating section 19.

The signal quality calculating portion 57 calculates the signal quality of the OFDM frequency region signal after completion of the distortion correction for the object symbol supplied from the transmission path distortion correcting portion 56. Also, the signal quality calculating portion 57 supplies information on the signal quality thus calculated to the filtering portion setting portion 51.

Here, when the object symbol is the transmission symbol of the CP, since the value of the transmission symbol of the CP is a known value, a distance (difference) between the known value and the OFDM frequency region signal after completion of the distortion correction for the object symbol, or the like can be obtained as the signal quality of the OFDM frequency region signal after completion of the distortion correction for the object symbol.

On the other hand, when the object symbol is the transmission symbol of the L1pre, unlike the CP, the transmission symbol of the L1pre is not a known value, but is the transmission symbol (BPSK symbol) in which only the BPSK is carried out so as to comply with the DVB-T.2. Thus, a value having relatively high reliability (hard decision value) can be obtained by the hard decision.

Then, the signal quality calculating portion 57 carries out the hard decision about the OFDM frequency region signal after completion of the direction correction for the transmission symbol of the L1pre as the object symbol supplied from the transmission path distortion correcting portion 56 (or the OFDM frequency region signal before the distortion correction). Also, the signal quality calculating portion 57 obtains a distance between the resulting decision value, in a word, (1, 0) or (−1, 0) as the coordinates (I, Q) on the IQ constellation, and the OFDM frequency region signal after completion of the distortion correction for the transmission symbols of the L1pre as the object symbol, or the like as the signal quality of the OFDM frequency region signal after completion of the distortion correction for the transmission symbols of the L1pre as the object symbol.

Filter Center Position Control in Capturing Mode

Figure 17:
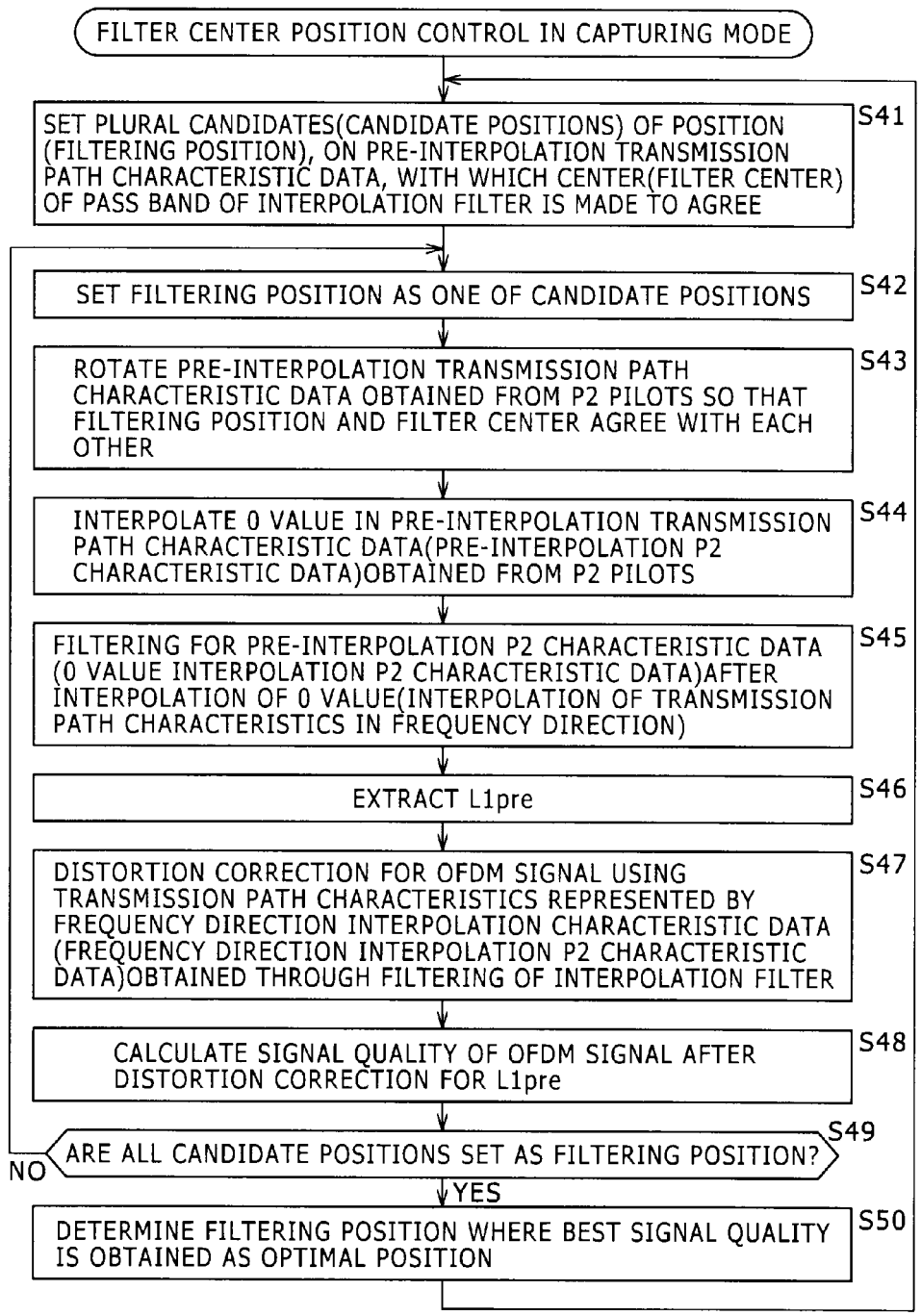
FIG. 17 is a flow chart explaining filter center position control in a capturing mode.

FIG. 17 is a flow chart explaining the filter center position control in the capturing mode which the filter center controlling portion 111 shown in FIG. 16 carries out.

The filter center position control in the capturing mode is started when the demodulation of the P2 symbols is started after the power source was turned ON (or the predetermined channel (the program got up by the broadcasting station) was selected), and the reception of the first T2 frame, and the detection and decoding of the P1 symbol contained in the first T2 frame have been carried out in the receiving apparatus (refer to FIG. 11).

In Step S41, the filtering position setting portion 51 sets plural (a predetermined number of) candidate positions becoming candidates of the filtering position as the position on the pre-interpolation transmission path characteristic data with which the filter center (the center of the pass band) of the interpolation filter 54 is made to agree. Then, the operation of the filter center controlling portion 111 proceeds to processing in Step S42.

Here, the filtering position setting portion 51, for example, can set plural positions or the like into which a predetermined range on the pre-interpolation transmission characteristic data is equally divided with the FFT start position of the P2 symbols as a center in a predetermined number of candidate positions.

In Step S42, the filtering position setting portion 51 sets one of the candidate positions, which are not yet set in the filtering position, of a predetermined number of candidate positions in the filtering position. Also, the filtering position setting portion 51 supplies position information representing the filtering position to the position adjusting portion 52. Then, the operation of the filter center controlling portion 111 proceeds to processing in Step S43.

In Step S43, the position adjusting portion 52 rotates the pre-interpolation transmission path characteristic data supplied thereto from the time direction interpolating portion 34 on the IQ constellation in accordance with the information position supplied thereto from the filtering position setting portion 51. As a result, the position of the filter center in the phase of the filtering for (the 0 value interpolation characteristic data obtained by the interpolating zero values in) the pre-interpolation transmission path characteristic data in the interpolation filter 54 is made to relatively agree with the filtering portion represented by the position information.

That is to say, in this case, the pilot extracting portion 31 (refer to FIG. 12) extracts the transmission symbols of the P2 pilot signal of the P2 symbols and supplies the transmission symbols thus extracted to the estimating portion 33 (refer to FIG. 12).

The estimating portion 33 estimates the transmission path characteristics for the transmission symbols of the P2 pilot signals supplied thereto from the pilot extracting portion 31 by using the transmission symbols concerned. Also, the estimating portion 33 supplies transmission characteristic data as the estimate values for the transmission path characteristics concerned to the time direction interpolating portion 34.

The time direction interpolating portion 34 directly outputs the transmission path characteristic data as the estimate values for the transmission path characteristics for the transmission symbols of the P2 pilot signals supplied thereto from the estimating portion 33 as the pre-interpolation transmission path characteristic data.

The estimate values for the transmission path characteristics for the transmission symbols of the P2 pilot signals (hereinafter referred to as "the pre-interpolation P2 characteristic data" as well) as the pre-interpolation transmission path characteristic data outputted by the time direction interpolating portion 34 in the manner as described above are supplied to the position adjusting portion 52.

Also, in the position adjusting portion 52, the pre-interpolation P2 characteristic data outputted by the time direction interpolation portion 34 is rotated in accordance with the position information supplied from the filtering position setting portion 51. As a result, the position of the filter center in the phase of the filtering for the 0 value interpolation characteristic data obtained by interpolating the zero values in the pre-interpolation P2 characteristic data in the interpolation filter 54 is made to relatively agree with the filtering position represented by the position information.

The pre-interpolation P2 characteristic data rotated in the position adjusting portion 52 is supplied to the up-sampling portion 53. Then, the operation of the filter center controlling portion 111 proceeds from the processing in Step S43 to processing in Step S44.

In Step S44, the up-sampling portion 53 interpolates zeros the number of which is equal to the number of transmission symbols in which none of the estimate values for the transmission path characteristics is obtained when viewed in the frequency direction between the sample values of the pre-interpolation P2 characteristic data supplied thereto from the position adjusting portion 52. Also, the up-sampling portion 53 supplies the resulting 0 value interpolation characteristic data (hereinafter referred to as "the 0 value interpolation P2 characteristic data" as well) to the interpolation filter 54. Then, the operation of the filter center controlling portion 111 proceeds to processing in Step S45.

In Step S45, the interpolation filter 54 filters the 0 value interpolation P2 characteristic data supplied thereto from the up-sampling portion 53, thereby obtaining the frequency direction interpolation characteristic data as the estimate values for the transmission path characteristics for which the interpolation in the frequency direction has been carried out. Also, the interpolation filter 54 supplies the frequency direction interpolation characteristic data thus obtained to the transmission path distortion correcting portion 56.

On the other hand, in Step S46, the symbol extracting portion 55 extracts the transmission symbol of the L1pre contained in the P2 symbols as the object symbol as the transmission symbol becoming an object of the calculation for the signal quality in the signal quality calculating portion 57 from the OFDM frequency region supplied thereto from the FFT portion 18, thereby supplying the transmission symbol of the L1pre thus extracted to the transmission path distortion correcting portion 56. Then, the operation of the filter center controlling portion 111 proceeds to processing in Step S47.

In Step S47, the transmission path distortion correcting portion 56 carries out the distortion correction for the transmission symbol of the L1pre by dividing the OFDM frequency region signal of the transmission symbol of the L1pre as the object symbol supplied thereto from the symbol extracting portion 55 by the frequency direction interpolation characteristic data supplied thereto from the interpolation filter 54. Also, the transmission path distortion correcting portion 56 supplies the OFDM frequency region signal obtained by carrying out the distortion correction for the transmission symbol of the L1pre to the signal quality calculating portion 57. Then, the operation of the filter center controlling portion 111 proceeds to processing in Step S48.

In Step S48, the signal quality calculating portion 57 calculates the signal quality of the OFDM frequency region signal after completion of the distortion correction for the transmission symbol of the L1pre supplied thereto from the transmission path distortion correcting portion 56, and supplies information on the signal quality thus calculated to the filtering position setting portion 51. Then, the operation of the filter center controlling portion 111 proceeds to processing in Step S49.

That is to say, the signal quality calculating portion 57, for example, carries out the hard decisions about the respective transmission symbols of the L1pre contained in one or plural P2 symbols in the T2 frame of one frame to which the OFDM frequency region signal after completion of the distortion correction is supplied from the transmission path distortion correcting portion 56. Also, the signal quality calculating portion 57 obtains a total sum of the resulting hard decision values and the OFDM frequency region signals after completion of the distortion correction for the transmission symbols of the L1pre in the form of the signal quality of the OFDM frequency region signals after completion of the distortion correction for the transmission symbols of the L1pre. Also, the signal quality calculating portion 57 supplies information on the signal quality thus obtained to the filtering position setting portion 51.

In Step S49, the filtering position setting portion 51 temporarily stores therein the information (the candidate positions set in) the filtering position, and the information on the signal quality supplied thereto from the signal quality calculating portion 57 in such a way that the filtering position and the signal quality are made to correspond to each other. Also, the filtering position setting portion 51 determines whether or not all of a predetermined number of candidate positions are set in the filtering position.

When it is determined in Step S49 that all of a predetermined number of candidate positions are not yet set in the filtering position, that is, when some candidate positions which are not yet set in the filtering position exist in a predetermined number of candidate positions (NO), the operation of the filter center controlling portion 111 returns back to the processing in Step S42. Then, the filtering position setting portion 51 sets one of some candidate positions which are not yet set in the filtering position of a predetermined number of candidate positions in the filtering position.

Also, the filtering position setting portion 51 supplies the position information representing the filtering position to the position adjusting portion 52. After that, the same predetermined pieces of processing are repetitively executed.

On the other hand, when it is determined in Step S49 that all of a predetermined number of candidate positions have been set in the filtering position (YES), the operation of the filter center controlling portion 111 proceeds to processing in Step S50. Then, the filtering position setting portion 51 determines the filtering position which is made to correspond to the best signal quality as the optimal position.

In addition, the filtering position setting portion 51 supplies the optimal position information representing the optimal position to the position adjusting portion 36 (refer to FIG. 12), thereby (relatively) controlling the position of the filter center of the interpolation filter 39 (refer to FIG. 12).

After that, after it is waited for that the subsequent T2 frame is received, the operation of the filter center controlling portion 111 returns from the processing in Step S50 back to the processing in Step S41. After that, the same predetermined pieces of processing are repetitively executed until the pilot pattern having the pilot signals contained in the L1pre is acquired.

As has been described, in the filter center position control in the capturing mode, the filter center controlling portion 111 (refer to FIG. 16) filters (the 0 value interpolation characteristic data in which the zero values are interpolated in) the pre-interpolation transmission path characteristic data as the estimate values of the transmission path characteristics for the transmission symbols of the P2 pilot signals obtained by using the transmission symbols of the P2 pilot signals which are contained in the P2 symbols (preamble symbols) in the estimating portion 33 in the interpolation filter 54 while the filtering position becoming the position of the filter center is adjusted. Thereby, the filter center controlling portion 111 obtains the frequency direction interpolation characteristic data for which the interpolation in the frequency direction has been carried out (the transmission path characteristic data as the estimate values for the transmission path characteristics for the transmission symbols of the P2 symbols).

In addition, the filter center controlling portion 111 carries out the distortion correction for the transmission symbols of the L1pre contained in the P2 symbols by using the frequency direction interpolation characteristic data. Also, the filter center controlling portion 111 obtains the signal quality of the transmission symbols of the L1pre after completion of the distortion correction.

Also, the filter center controlling portion 111 obtains the optimal position as the filtering position where the signal quality is made best. As a result, the filter center controlling portion 111 carries out the control in such a way that the position of the filter center of the interpolation filter 39 (refer to FIG. 12) is made to (relatively) agree with the optimal position.

Therefore, in the receiving apparatus shown in FIG. 11, before the L1 contained in the P2 symbols is decoded after the reception of the OFDM signal is started, the control for causing the position of the filter center of the interpolation filter 39 (refer to FIG. 12) to agree with the optimal position is carried out by using the P2 symbols. Therefore, for example, even in the case of the multi-path having such large delay spreading as to exceed Tu/(2×Dx) (however, the multi-path having delay spreading equal to or smaller than Tu/Dx), the entire multi-path can be contained in the pass band of the interpolation filter 39. Thus, it is possible to prevent the deterioration of the precision of the frequency direction interpolation characteristic data outputted by the interpolation filter 39, that is, it is possible to prevent the deterioration of the estimation precision of the transmission path characteristics.

As a result, in the receiving apparatus shown in FIG. 11, the suitable distortion correction (the distortion correction for making the amplitude and phase of the sub-carrier of the OFDM signal received by the receiving apparatus closer to the amplitude and phase of the sub-carrier of the OFDM signal transmitted by the transmitting apparatus) is carried out for the P2 symbols in the transmission path distortion correcting portion 20. Therefore, it is possible to prevent the L1 contained in the P2 symbols from failing in decoding (the possibility that the L1 contained in the P2 symbols fails in decoding can be made very low).

Note that, in the filter center position control in the capturing mode shown in FIG. 17, the transmission symbol of the L1pre contained in the P2 symbols is set as the object symbol as an object of the calculation for the signal quality. However, in addition thereto, the transmission symbol other than the transmission symbols of the L1pre and the P2 pilot signals which are all contained in the P2 symbols can be adopted as the object symbol.

However, when the transmission symbol other than the transmission symbols of the L1pre and the P2 pilot signals which are all contained in the P2 symbols is adopted as the object symbol, a modulation system of that transmission symbol is not limited to the BPSK unlike the transmission symbol of the L1pre. Therefore, it is necessary to recognize the modulation system of the transmission symbol adopted as the object symbol by utilizing some sort of method.

In addition, when the modulation system of the transmission symbol adopted as the object symbol is multiple-value (four or more values) modulation (digital modulation) such as the QPSK or the 16 QM other than the BPSK, in the calculation for the signal quality of the object symbol, the reliability of the hard decision values obtained by the hard decisions is reduced as compared with the case where the transmission symbol of the L1pre as the BPSK symbol is set as the object symbol.

In addition, in the filter center position control in the capturing mode shown in FIG. 17, the estimation for the transmission path characteristics is carried out by using all of the transmission symbols of the P2 pilot signals contained in the P2 symbols. Also, the signal quality after completion of the distortion correction for the transmission symbol of the L1pre as the object symbol is obtained with the transmission symbol of the L1pre contained in the P2 symbols as the object symbol. However, the estimation for the transmission path characteristics can be carried out by using a part of the transmission symbols of the P2 pilot signals contained in the P2 symbols. Also, the signal quality can be obtained with the remainder of the transmission symbols of the P2 pilot signals contained in the P2 symbols as the object symbol.

In this case, since the value of the transmission symbol of the P2 pilot signal becoming the object symbol is known, the signal quality of the object symbol after completion of the distortion correction can be obtained without carrying out any of the hard decisions.

However, when only a part of the transmission symbols of the P2 pilot signals contained in the P2 symbols is used in the estimation for the transmission path characteristics, the number of transmission symbols in the frequency direction interpolation in each of the interpolation filters 39 and 54 becomes large. Therefore, the pass band of each of the interpolation filters 39 and 54 becomes narrow (it is necessary to narrow the pass band of each of the interpolation filters 39 and 54). As a result, the delay spreading of the multi-path in which the transmission path characteristics can be precisely estimated also becomes small.

Filter Center Position Control in Following Mode

Figure 18:
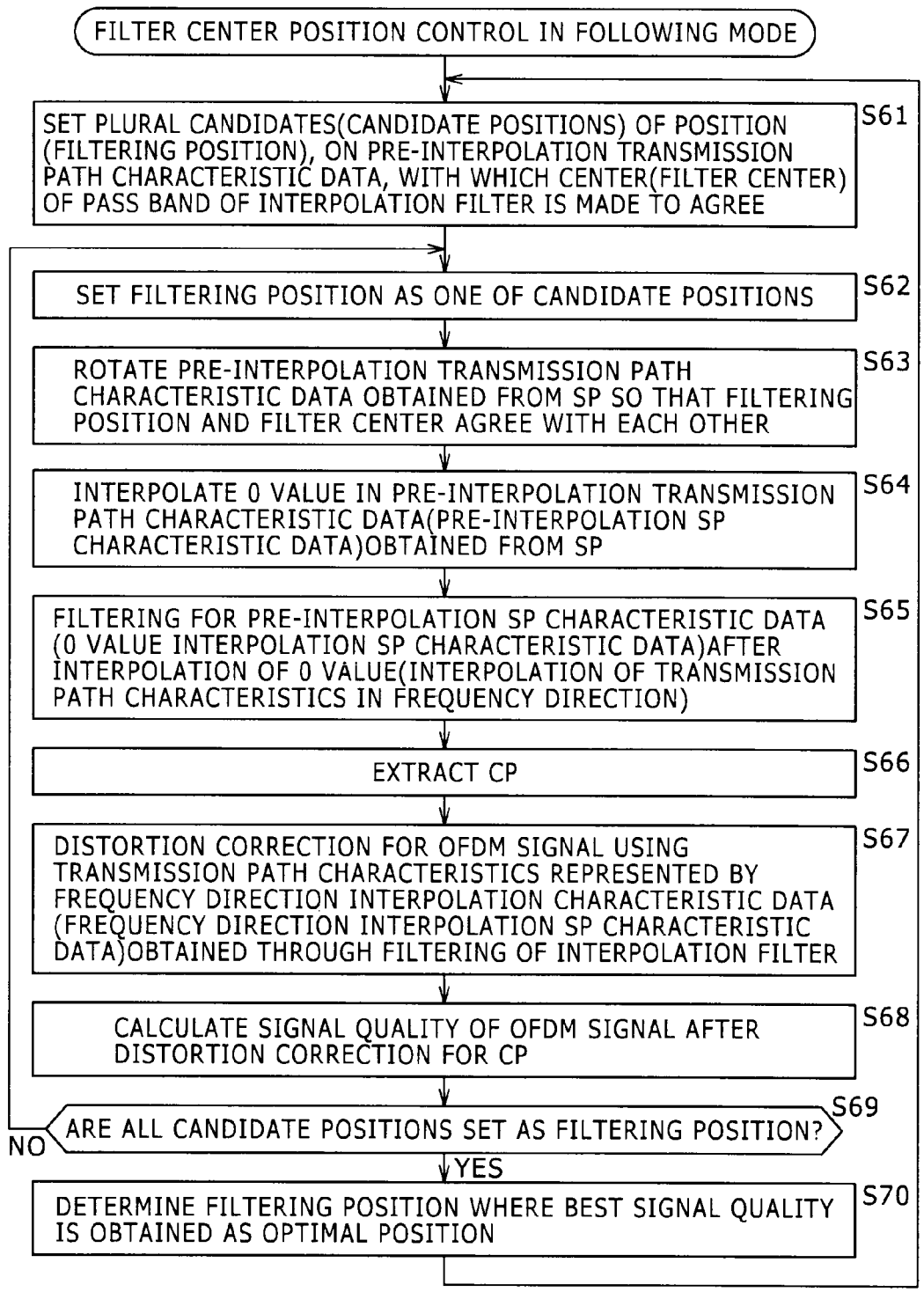
FIG. 18 is a flow chart explaining filter center position control in a following mode.

FIG. 18 is a flow chart explaining the filter center position control in the following mode which the filter center controlling portion 111 shown in FIG. 16 carries out.

When the pilot pattern of the data symbols contained in the L1pre is recognized (acquired) in the receiving apparatus (refer to FIG. 11), the filter center position control in the following mode is started.

That is to say, as previously described with reference to FIG. 17, in the filter center position control in the capturing mode, the receiving apparatus carries out the estimation for the transmission path characteristics in which the deterioration of the precision is prevented by using the P2 symbols. However, by the filter center position control in the capturing mode, when the receiving apparatus succeeds in decoding of the L1 contained in the P2 symbols to recognize (acquire) the pilot pattern of the data symbols contained in the L1pre, the receiving apparatus ends the filter center position control in the capturing mode (refer to FIG. 17) to start the filter center position control in the following mode (refer to FIG. 18).

In the filter center position control in the following mode (refer to FIG. 18), in Step S61, similarly to the case of the processing in Step S41 shown in FIG. 17, the filtering position setting portion 51 sets plural (a predetermined number of) candidate positions becoming the candidates of the filtering portion. Then, the operation of the filter center controlling portion 111 proceeds to processing in Step S62.

Here, in Step S61, in the filtering position setting portion 51, for example, plural positions into which a predetermined range on the pre-interpolation transmission path characteristic data is equally divided, or the like with the optimal position obtained in the filter center position control in the capturing mode (refer to FIG. 17) ended right before the filter center position control in the following mode as a center can be set as a predetermined number of candidate positions.

In Step S62, the filtering position setting portion 51 sets one of the candidate positions, which are not yet set in the filtering position, of a predetermined number of candidate positions in the filtering position. Also, the filtering position setting portion 51 supplies position information representing the filtering position to the position adjusting portion 52. Then, the operation of the filter center controlling portion 111 proceeds to processing in Step S63.

In Step S63, the position adjusting portion 52 rotates the pre-interpolation transmission path characteristic data supplied thereto from the time direction interpolating portion 34 on the IQ constellation in accordance with the information position supplied thereto from the filtering position setting portion 51. As a result, the position of the filter center in the phase of the filtering for the pre-interpolation transmission path characteristic data in the interpolation filter 54 is made to relatively agree with the filtering portion represented by the position information.

That is to say, in this case, since the pilot pattern of the data symbols is recognized, the pilot extracting portion 31 (refer to FIG. 12) extracts the transmission symbols of the SPs of the data symbols in accordance with the pilot pattern, and supplies the transmission symbols thus extracted to the estimating portion 33 (refer to FIG. 12).

The estimating portion 33 estimates the transmission path characteristics for the transmission symbols of the SPs supplied thereto from the pilot extracting portion 31 by using the transmission symbols concerned. Also, the estimating portion 33 supplies transmission path characteristic data as the estimate values for the transmission path characteristics to the time direction interpolating portion 34.

The time direction interpolating portion 34 carries out the interpolation in the time direction for the transmission path characteristic data as the estimate values of the transmission path characteristics for the transmission symbols of the SPs supplied thereto from the estimating portion 33. Also, the time direction interpolating portion 34 outputs pre-interpolation transmission path characteristic data (hereinafter referred to as "pre-interpolation SP characteristic data" as well) as time direction interpolation characteristic data obtained through the interpolation in the time direction.

The pre-interpolation SP characteristic data (the data obtained through the interpolation in the time direction for the estimate values for the transmission path characteristics for the transmission symbols of the SPs) which has been outputted by the time direction interpolating portion 34 in the manner as described above is supplied to the position adjusting portion 52.

Also, in the position adjusting portion 52, the pre-interpolation SP characteristic data which has been outputted by the time direction interpolation portion 34 is rotated in accordance with the position information supplied thereto from the filtering position setting portion 51. As a result, the position of the filter center in the phase of the filtering for the 0 value interpolation characteristic data obtained by interpolating the zero values in the pre-interpolation SP characteristic data in the interpolation filter 54 is made to relatively agree with the filtering position represented by the position information.

The pre-interpolation SP characteristic data which has been rotated on the IQ constellation in the position adjusting portion 52 is supplied to the up-sampling portion 53. Then, the operation of the filter center controlling portion 111 proceeds from processing in Step S63 to processing in Step S64.

In Step S64, the up-sampling portion 53 interpolates zeros the number of which is equal to the number of transmission symbols in which none of the estimate values for the transmission path characteristics is obtained when viewed in the frequency direction between the sample values of the pre-interpolation SP characteristic data supplied thereto from the position adjusting portion 52. Also, the up-sampling portion 53 supplies the resulting 0 value interpolation characteristic data (hereinafter referred to as "the 0 value interpolation SP characteristic data" as well) to the interpolation filter 54. Then, the operation of the filter center controlling portion 111 proceeds to processing in Step S65.

In Step S65, the interpolation filter 54 filters the 0 value interpolation SP characteristic data supplied thereto from the up-sampling portion 53, thereby obtaining the frequency direction interpolation characteristic data as the estimate values for the transmission path characteristics for which the interpolation in the frequency direction has been carried out. Also, the interpolation filter 54 supplies the frequency direction interpolation characteristic data thus obtained to the transmission path distortion correcting portion 56.

On the other hand, in Step S66, the symbol extracting portion 55 extracts the known value, for example, the transmission symbol of the CP contained in the data symbols as the object symbol as the transmission symbol becoming the object of the calculation for the signal quality in the signal quality calculating portion 57 from the OFDM frequency region signal supplied thereto from the FFT portion 18. Also, the symbol extracting portion 55 supplies the transmission symbol of the CP thus extracted to the transmission path distortion correcting portion 56. Then, the operation of the filter center controlling portion 111 proceeds to processing in Step S67.

In Step S67, the transmission path distortion correcting portion 56 carries out the distortion correction for the transmission symbol of the CP by dividing the OFDM frequency region signal of the transmission symbol of the CP as the object symbol supplied thereto from the symbol extracting portion 55 by the frequency direction interpolation characteristic data supplied thereto from the interpolation filter 54. Also, the transmission path distortion correcting portion 56 supplies the OFDM frequency region signal obtained by carrying out the distortion correction for the transmission symbol of the CP to the signal quality calculating portion 57. Then, the operation of the filter center controlling portion 111 proceeds to processing in Step S68.

In Step S68, the signal quality calculating portion 57 calculates the signal quality of the OFDM frequency region signal after completion of the distortion correction for the transmission symbol of the CP supplied thereto from the transmission path distortion correcting portion 56. Also, the signal quality calculating portion 57 supplies information on the signal quality thus calculated to the filtering position setting portion 51. Then, the operation of the filter center controlling portion 111 proceeds to processing in Step S69.

That is to say, since the transmission symbols of the CPs are known values, the signal quality calculating portion 57, for example, obtains a total sum of distances between the known values of the transmission symbols of the CPs contained in one or plural data symbols (OFDM symbols) in the T2 frame of one frame to which the OFDM frequency region signals after completion of the distortion correction is supplied from the transmission path distortion correcting portion 56, and the OFDM frequency region signals after completion of the distortion correction for the transmission symbols of the CPs as the signal quality of the OFDM frequency region signals after completion of the distortion correction for the transmission symbols of the CPs. Also, the signal quality calculating portion 57 supplies information on the signal quality thus obtained to the filtering position setting portion 51.

In Step S69, the filtering position setting portion 51 temporarily stores therein the information (the candidate positions set in) the filtering position, and the information on the signal quality supplied thereto from the signal quality calculating portion 57 in such a way that the filtering position and the signal quality are made to correspond to each other. Also, the filtering position setting portion 51 determines whether or not all of a predetermined number of candidate positions are set in the filtering position.

When it is determined in Step S69 that all of a predetermined number of candidate positions are not yet set in the filtering position, that is, when some candidate positions each of which is not yet set in the filtering position exist in a predetermined number of candidate positions (NO), the operation of the filter center controlling portion 111 returns back to the processing in Step S62. Then, the filtering position setting portion 51 sets one of some candidate positions each of which is not yet set in the filtering position of a predetermined number of candidate positions in the filtering position.

Also, the filtering position setting portion 51 supplies the position information representing the filtering position to the position adjusting portion 52. After that, the same predetermined pieces of processing are repetitively executed.

On the other hand, when it is determined in Step S69 that all of a predetermined number of candidate positions have been set in the filtering position (YES), the operation of the filter center controlling portion 111 proceeds to processing in Step S70. Then, the filtering position setting portion 51 determines the filtering position which is made to correspond to the best signal quality as the optimal position.

In addition, the filtering position setting portion 51 supplies the optimal position information representing the optimal position to the position adjusting portion 36 (refer to FIG. 12), thereby (relatively) controlling the position of the filter center of the interpolation filter 39 (refer to FIG. 12).

After that, the operation of the filter center controlling portion 111 returns from the processing in Step S70 back to the processing in Step S61. Also, thereafter, the same predetermined pieces of processing are repetitively executed for the subsequent data symbol.

As has been described, in the filter center position control in the following mode, the position of the filter center of the interpolation filter 39 (refer to FIG. 12) is controlled by using the data symbols.

Note that, in the filter center position control in the following mode shown in FIG. 18, the interpolation in the time direction is carried out for the estimate values of the transmission path characteristics (SP transmission path characteristic data) for the transmission symbols of the SPs which have been estimated by using the transmission symbols of the SPs. Also, the 0 value interpolation SP characteristic data obtained by interpolating the 0 values in the frequency direction of the pre-interpolation SP characteristic data obtained through the above interpolation is set as the object of the filtering in the interpolation filter 54 (and the interpolation filter 39). However, in the interpolation filter 54, the 0 value interpolation SP characteristic data obtained by carrying out the interpolation of the 0 value in the frequency direction without carrying out the interpolation in the time division is not carried out for the SP transmission path characteristic data can be set as the object of the filtering.

When the 0 value interpolation SP characteristic data obtained by carrying out the interpolation of the 0 value in the frequency direction without carrying out the interpolation in the time division is not carried out for the SP transmission path characteristic data is set as the object of the filtering in (each of) the interpolation filter 54 (and the interpolation filter 39), the number of transmission symbols in the frequency direction which are interpolated in the interpolation filter 54 becomes large. Therefore, the pass band of (each of) the interpolation filter 54 (and the interpolation filter 39) becomes narrow (it is necessary to narrow the pass band of the interpolation filter 54). As a result, the delay spreading of the multi-path in which the transmission path characteristics can be precisely estimated also becomes small.

However, in this case, with regard to the transmission path in which a fluctuation in time is large, the precision of estimation of the transmission path characteristics can be enhanced in exchange for that the delay spreading of the multi-path in which the estimation of the transmission path characteristics can be precisely carried out becomes small.

In addition, in the filter center position control in the following mode in FIG. 18, the signal quality can be obtained with each of the transmission symbols other than the CPs as the object.

That is to say, the transmission symbols adapted to the multiple modulation having small values such as the BPSK or the QPSK are arranged in the positions previously determined of the data symbols. Also, the hard decision is carried out with each of the transmission symbols as the object symbol, and thus the signal quality can be obtained.

Configuration of Receiving System

Figure 19:
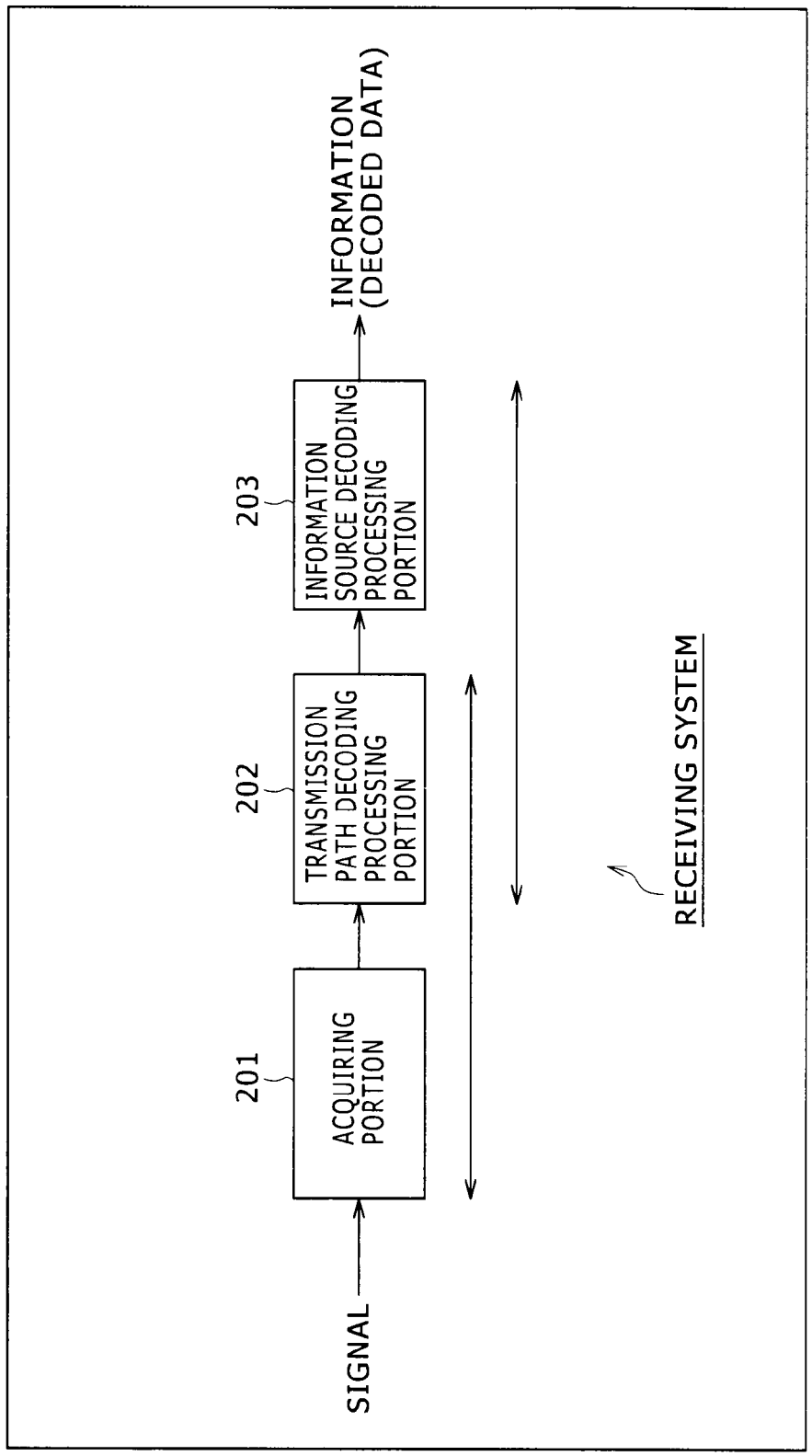
FIG. 19 is a block diagram showing a configuration of a first embodiment of a receiving system, according to the present disclosure, to which the embodiment of the receiving apparatus is applied.

FIG. 19 is a block diagram showing a configuration of a first embodiment of a receiving system to which the embodiment of the receiving apparatus shown in FIG. 11 is applied.

Referring to FIG. 19, the receiving system is composed of an acquiring portion 201, a transmission path decoding processing portion 202, and an information source decoding processing portion 203.

The acquiring portion 201, for example, acquires the OFDM signal obtained by modulating the data such as a program or the like of a television broadcasting in accordance with the OFDM system.

That is to say, a broadcasting station or web server (not shown) is adapted to transmit the OFDM signal. The acquiring portion 201 acquires that OFDM signal.

Here, when the OFDM signal, for example, is broadcasted from the broadcasting station through a terrestrial wave, a satellite wave, a Cable Television (CATV) network or the like, the acquiring portion 201 is composed of a tuner, a Set Top Box (STB) or the like. In addition, when the OFDM signal, for example, is transmitted in the form of multicast like an Internet Protocol Television (IPTV) from the web server, the acquiring portion 201, for example, is composed of a network Interface (I/F) such as a Network Interface Card (NIC).

The acquiring portion 201, for example, acquires the OFDM signal through a transmission path (not shown) such as a terrestrial digital broadcasting, a satellite digital broadcasting, a CATV network, the Internet or any other suitable network, and supplies the OFDM signal to the transmission path decoding processing portion 202.

The transmission path decoding processing portion 202 subjects the OFDM signal which the acquiring portion 201 has acquired through the transmission path to transmission path decoding processing including at least decoding and processing for correcting an error caused in the transmission path. Also, the transmission path decoding processing portion 202 supplies the resulting signal to the information source decoding processing portion 203.

That is to say, the OFDM signal which the acquiring portion 201 has acquired through the transmission path is one which has been subjected to at least error correction coding for correcting the error caused in the transmission path. The transmission path decoding processing portion 202 subjects such an OFDM signal to the transmission path decoding processing such as the decoding and the error correction processing.

Here, LDPC encoding, Reed-Solomon coding or the like, for example, is given as the error correction encoding.

The information source decoding processing portion 203 subjects the signal which has been subjected to the transmission path decoding processing to information source decoding processing including at least processing for expanding compressed information to original information.

That is to say, the OFDM signal which the acquiring portion 201 has acquired through the transmission path is subjected to compression encoding for compressing information in order to reduce an amount of data on an image or a sound as the information in some cases. In such cases, the information source decoding processing portion 203 subjects the signal which has been subjected to the transmission path decoding processing to information source decoding processing such as processing (expansion processing) for expanding the compressed information to the original information.

It is noted that when the OFDM signal which the acquiring portion 201 has acquired through the transmission path is not subjected to the compression coding, the information source decoding processing portion 203 does not execute the processing for expanding the compressed information to the original information.

Here, an MPEG decoding or the like, for example, is given as the expansion processing. In addition, in addition to the expansion processing, descramble or the like is contained in the transmission path decoding processing in some cases.

In the receiving system configured in the manner as described above, the acquiring portion 201, for example, subjects the data on an image, a sound or the like to the compression encoding such as the MPEG coding. In addition, the acquiring portion 201 acquires the OFDM signal which has been subjected to the error correction coding such as the LDPC encoding through the transmission path, and supplies the OFDM signal thus acquired to the transmission path decoding processing portion 202.

The transmission path decoding processing portion 202 subjects the OFDM signal supplied thereto from the acquiring portion 201 to the transmission path decoding processing, and supplies the resulting signal to the information source decoding processing portion 203.

In the information source decoding processing portion 203, the signal from the transmission path decoding processing portion 202 is subjected to the information source decoding processing such as the MPEG decoding. Also, the resulting image or sound is outputted.

The receiving system shown in FIG. 19 as described above, for example, can be applied to a television tuner for receiving a television broadcasting as a digital broadcasting, or the like.

It is noted that each of the acquiring portion 201, the transmission path decoding processing portion 202, and the information source decoding processing portion 203 can be configured in the form of one independent unit (hardware (such as an Integrated Circuit (IC)), or a software module).

In addition, with regard to the acquiring portion 201, the transmission path decoding processing portion 202, and the information source decoding processing portion 203, a set of acquiring portion 201 and transmission path decoding processing portion 202, a set of transmission path decoding processing portion 202 and the information source decoding processing portion 203, and a set of acquiring portion 201, transmission path decoding processing portion 202, and information source decoding processing portion 203 can be each configured in the form of one independent unit.

Here, the embodiment of the receiving apparatus shown in FIG. 11 can be applied to the acquiring portion 201 and the transmission path decoding processing portion 202.

Figure 20:
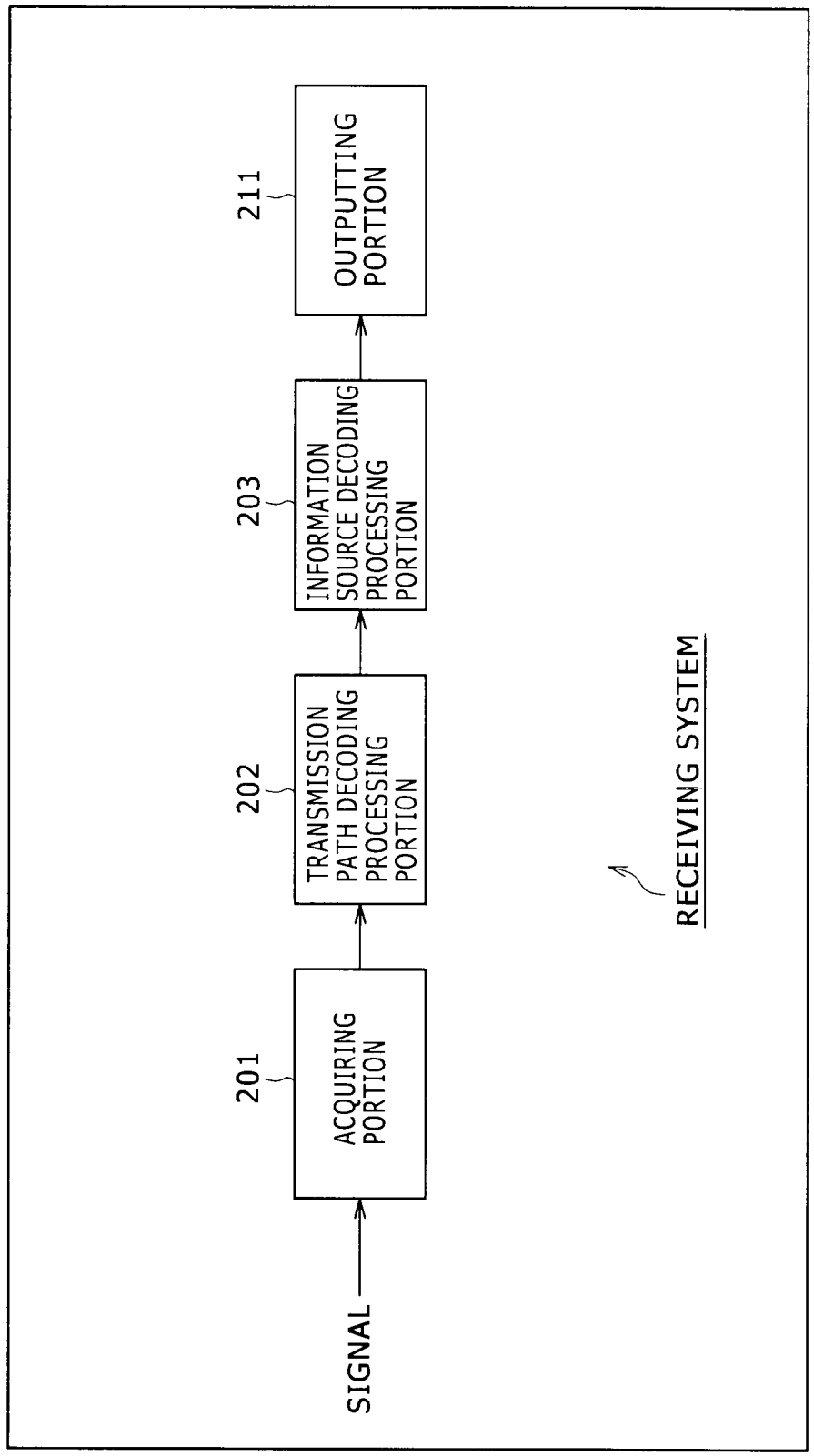
FIG. 20 is a block diagram showing a configuration of a second embodiment of a receiving system, according to the present disclosure, to which the embodiment of the receiving apparatus is applied.

FIG. 20 is a block diagram showing a configuration of a second embodiment of the receiving system to which the embodiment of the receiving apparatus shown in FIG. 11 is applied.

It is noted that in FIG. 20, portions corresponding to those in the receiving system shown in FIG. 19 are designated by the same reference numerals, respectively, and a description thereof is suitably omitted below for the sake of simplicity.

The receiving system shown in FIG. 20 is identical to the receiving system shown in FIG. 19 in that it includes the acquiring portion 201, the transmission path decoding processing portion 202, and the information source decoding processing portion 203. On the other hand, the receiving system shown in FIG. 20 is different from the receiving system shown in FIG. 19 in that an outputting portion 211 is newly provided.

The outputting portion 211, for example, is a display device for displaying thereon an image, or a speaker for outputting a sound. Thus, the outputting portion 211 outputs an image, a sound or the like corresponding to a signal outputted from the information source decoding processing portion 203. That is to say, the outputting portion 211 either displays thereon an image or outputs a sound.

The receiving system shown in FIG. 20 as described above, for example, can be applied to a TV set for receiving a broadcasting as a digital broadcasting, a radio receiver for receiving a radio broadcasting, or the like.

It is noted that when the signal which has been acquired in the acquiring portion 201 is not subjected to the compression encoding, the signal outputted from the transmission path decoding processing portion 202 bypasses the information source decoding processing portion 203 to be supplied to the outputting portion 211.

Figure 21:
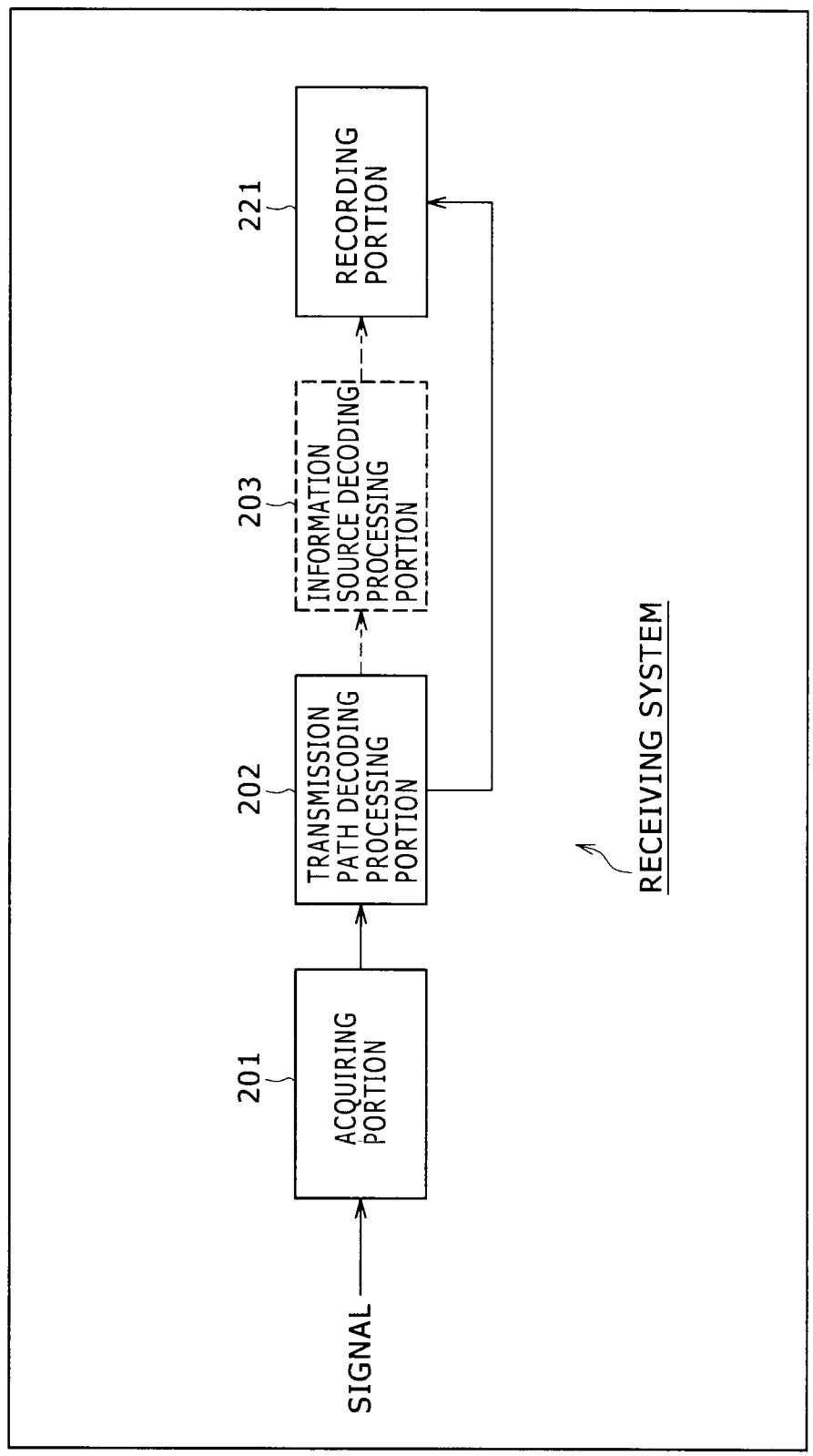
FIG. 21 is a block diagram showing a configuration of a third embodiment of a receiving system, according to the present disclosure, to which the embodiment of the receiving apparatus is applied.

FIG. 21 is a block diagram showing a configuration of a third embodiment of the receiving system to which the embodiment of the receiving apparatus shown in FIG. 11 is applied.

It is noted that in FIG. 21, portions corresponding to those in the receiving system shown in FIG. 19 are designated by the same reference numerals, respectively, and a description thereof is suitably omitted below for the sake of simplicity.

The receiving system shown in FIG. 21 is identical to the receiving system shown in FIG. 19 in that it includes the acquiring portion 201 and the transmission path decoding processing portion 202.

However, the receiving system shown in FIG. 21 is different from the receiving system shown in FIG. 19 in that no information source decoding processing portion 203 is provided, and a recording portion 221 is newly provided.

The recording portion 221 records a signal (for example, a TS packet of a TS complying with the MPEG system) which has been outputted by the transmission path decoding processing portion 202 in a recording (storing) medium such as an optical disc, a hard disk (magnetic disk), or a flash memory (or causes the recording (storing) medium to record therein the signal which has been outputted by the transmission path decoding processing portion 202).

The receiving system shown in FIG. 21 as described above can be applied to a recorder for recording therein a television broadcasting, or the like.

It is noted that in FIG. 21, the receiving system can be configured by providing the information source decoding processing portion 203, and a signal which has been subjected to the information source decoding processing in the information source decoding processing portion 203, that is, information on an image or a sound which has been obtained through the decoding can be recorded in the recording portion 221.

Description of Computer to Which the Disclosure is Applied

Next, the series of processing descried above either can be executed by hardware or can be executed by software. When the series of processing is intended to be executed by the software, a program composing the software is installed in a general-purpose computer or the like.

Figure 22:
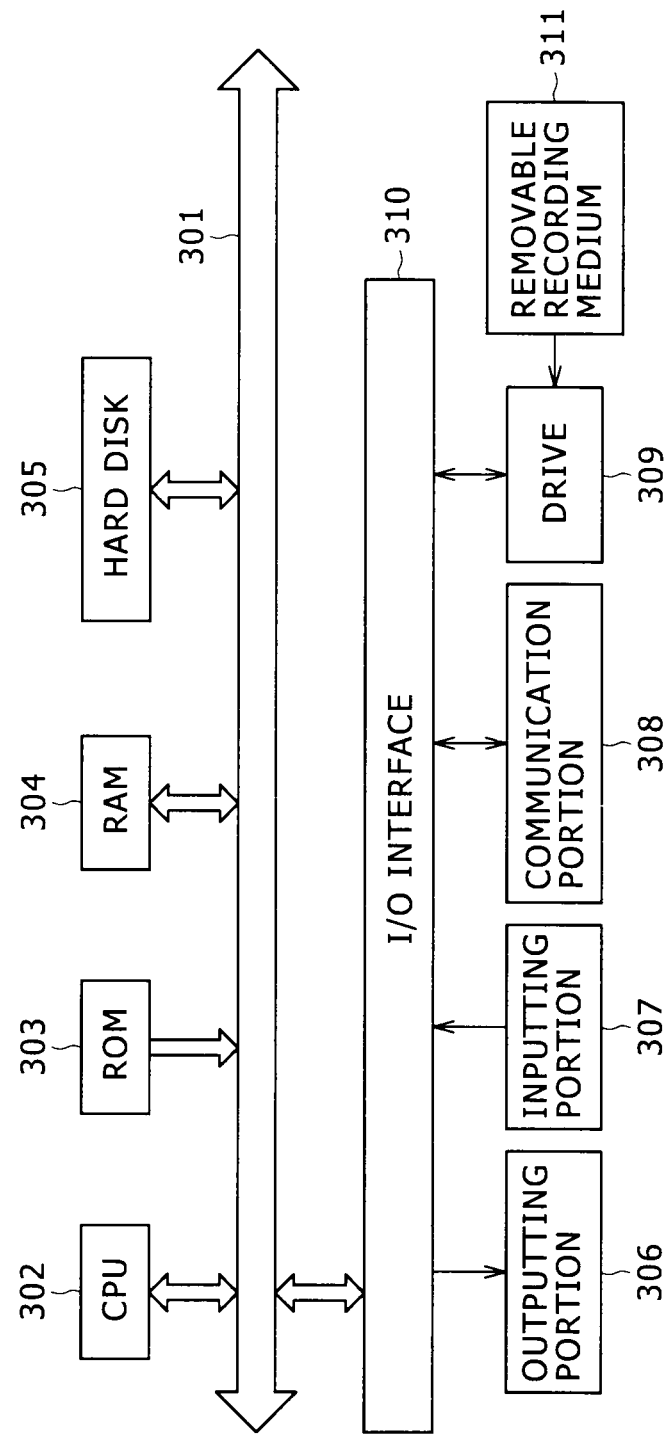
FIG. 22 is a block diagram showing a configuration of an application example of a computer to which the present disclosure is applied.

Thus, FIG. 22 shows a configuration of an application example of the computer in which the program intended to execute the series of processing described above is installed.

The program can be previously recorded in either a hard disk 305 or a ROM 303 each serving as a recording medium built in the computer.

Or, the program can be stored (recorded) in a removable recording medium 311. Such a removable recording medium 311 can be provided in the form of so-called packaged software. Here, a flexible disc, a Compact Disc Read Only Memory (CD-ROM), a Magneto Optical (MO) disc, a Digital Versatile Disc (DVD), a magnetic disc, a semiconductor memory, or the like, for example, can be given as the removable recording medium 311.

It is noted that in addition to the installation of the program from the removable recording medium 311 as described above in the computer, the program can be down-loaded into the computer through a communication network or a broadcasting network to be installed in the hard disk 305 built in the computer. That is to say, the program, for example, can be transferred from a down-load site to the computer in a wireless manner through an artificial satellite for the digital satellite broadcastings. Or, the program, for example, can be transferred to the computer in a wired manner through a network such as a Local Area Network (LAN) or the Internet.

The computer has a Central Processing Unit (CPU) 302 built therein, and an I/O interface 310 is connected to the CPU 302 through a bus 301.

When a command is inputted to the CPU 302 through the I/O interface 310 by manipulation or the like for the inputting portion 307 by a user, the CPU 302 executes the program stored in a Read Only Memory (ROM) 303 in accordance with the command thus inputted thereto. Or, the CPU 302 loads the program stored in the hard disk 305 in a Random Access Memory (RAM) 304 to execute the program thus loaded.

Thus, the CPU 302 executes the processing complying with the flow charts shown in FIGS. 17 and 18 described above, or the processing based on the configurations shown as the block diagrams described above. Also, the CPU 302, for example, outputs the processing results from the outputting portion 306, transmits the processing results from the communicating portion 308 or causes the hard disk 305 to record therein the processing results through the I/O interface 310 as may be necessary.

It is noted that the inputting portion 307 is composed of a keyboard, a mouse, a microphone or the like. In addition, the outputting portion 306 is composed of a Liquid Crystal Display (LCD) device, a speaker or the like.

Here, in this specification, the processing which the computer executes in accordance with the program needs not to be necessarily executed in a time series manner along the order described in any of the flow charts. That is to say, the processing which the computer executes in accordance with the program contains predetermined pieces of processing as well which are executed either in parallel or individually (for example, parallel processing or processing based on the object).

In addition, the program either may be processed by one computer (processor) or may be processed in a distribution manner by plural computers. In addition, the program may be transferred to a remote computer to be executed.

It is noted that embodiments of the present disclosure are by no means limited to the embodiments described above, and various changes can be made without departing from the subject matter of the present disclosure.

That is to say, the present disclosure, for example, can be applied to the case of reception of the OFDM signal which contains therein the preamble symbols as the OFDM symbols of the preamble in which the transmission symbols of the preamble signal containing therein the pilot pattern, and the transmission symbols of the pilot signals are arranged in the positions previously determined, respectively, and the data symbols as the OFDM symbols of the data in which the transmission symbols of the data are arranged and the transmission symbols of the pilot signals are arranged in accordance with the pilot pattern, contained in the preamble signals, of the plural pilot patterns previously determined in addition to the case of the reception of the OFDM signal complying with the DVB-T.2.

In addition, in the embodiment of the receiving apparatus, in the position adjusting portion 52 (refer to FIG. 16), the pre-interpolation transmission path characteristic data is rotated on the IQ constellation, thereby relatively controlling the position of the filter center in the phase of the filtering for (the 0 value interpolation characteristic data obtained from) the pre-interpolation transmission path characteristic data in the interpolation filter 54. However, in addition thereto, the control for the position of the filter center in the phase of the filtering in the interpolation filter 54 can also be carried out by changing the filter coefficient of the interpolation filter 54.

This also applies to the control for the position of the filter center of the interpolation filter 39.

In addition, in the filter center position control (refer to FIGS. 17 and 18), the signal quality can be obtained while the filtering position is gradually changed so that the signal quality is enhanced, and the filtering position when an extreme value of the signal quality is detected can be determined as the optimal position.

The present disclosure contains subject matter related to that disclosed in Japanese Priority Patent Application JP 2010-145804 filed in the Japan Patent Office on Jun. 28, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving apparatus, comprising:
    circuitry configured to:
        obtain pre-interpolation transmission path characteristic data as estimate values for transmission path characteristics as characteristics of a transmission path for transmission symbols of pilot signals of an Orthogonal Frequency Division Multiplexing (OFDM) signal by using the pilot signals contained in the OFDM signal, and filter the pre-interpolation transmission path characteristic data by using an interpolation filter, thereby obtaining transmission path characteristic data as estimate values for transmission path characteristics for transmission symbols of the OFDM signal;

carry out distortion correction for the OFDM signal by using the transmission path characteristic data; and
control a pass band of said interpolation filter, wherein
the OFDM signal contains therein a preamble symbol in which transmission symbols of a preamble signal and transmission symbols of a pilot signal are arranged in positions previously determined, respectively,
to filter the pre-interpolation transmission path characteristic data the circuitry is further configured to filter the pre-interpolation transmission path characteristic data as the estimate values of the transmission path characteristics for the transmission symbols of the pilot signal contained in the preamble symbol obtained by using the transmission symbols of the pilot signal contained in the preamble symbol by using said interpolation filter while the pass band is adjusted, thereby obtaining the transmission path characteristic data as the estimate values of the transmission path characteristics for the transmission symbols of the OFDM singal,
to carry out the distortion correction for the OFDM signal, the circuitry is further configured to carry out the distortion correction for transmission symbols of the preamble symbol by using the transmission path characteristic data,
the circuitry is further configured to:
obtain a signal quality of the transmission symbols of the preamble signal after completion of the distortion correction; and
obtain the pass band in which the signal quality is made best,
the OFDM signal further contains therein data symbols in which transmission symbols of data are arranged, and the transmission symbols of the pilot signal are arranged with the data in accordance with one of plural pilot patterns previously determined,
the preamble signal contains therein information on a pilot pattern of the data symbols, and
to control the pass band of said interpolation filter the circuitry is further configured to:
control the pass band by using the transmission symbols of the preamble symbol so that a signal quality of the OFDM signal after completion of the distortion correction is made best before the information on the pilot pattern of the data symbols contained in the preamble signal is acquired; and
control the pass band by using the transmission symbols of the data symbols so that the signal quality of the OFDM signal after completion of the distortion correction is made best after the information on the pilot pattern of the data symbols contained in the preamble signal is acquired.

2. The receiving apparatus according to claim 1, wherein the circuitry is further configured to obtain the signal quality of the transmission symbols, after completion of the distortion correction with a transmission symbol of Binary Phase Shift Keying (BPSK) of the preamble signal as an object.

3. The receiving apparatus according to claim 2, wherein the OFDM signal is a signal complying with a standard of DVB-T.2;
the preamble signal is an L1 portion complying with the standard of the DVB-T.2;
the preamble symbol is an OFDM symbol of P2 of the standard of the DVB-T.2; and
the circuitry is further configured to obtain the signal quality of the transmission symbols, after completion of the distortion correction with a transmission symbol of L1pre of the L1 portion complying with the standard of the DVB-T.2 as an object.

4. The receiving apparatus according to claim 1, wherein the circuitry is further configured to:
filter the pre-interpolation transmission path characteristic data as the estimate values of the transmission path characteristics for a part of the transmission symbols obtained by using a part of the transmission symbols of the pilot signal contained in the preamble symbol by using said interpolation filter while the pass band is adjusted, thereby obtaining the transmission path characteristic data as the estimate values of the transmission path characteristics for the transmission symbols of the OFDM signal;
carry out the distortion correction for the transmission symbols of the preamble symbol by using the transmission path characteristic data;
obtain the signal quality of the transmission symbols after completion of the distortion correction with respect to a remainder of the transmission symbols of the pilot signal; and
obtain the pass band in which the signal quality is made best.

5. The receiving apparatus according to claim 1, wherein the circuitry is further configured to control a position of a filter center as a center of the pass band of said interpolation filter.

6. A receiving method, comprising:
obtaining pre-interpolation transmission path characteristic data as estimate values for transmission path characteristics as characteristics of a transmission path for transmission symbols of pilot signals of an Orthogonal Frequency Division Multiplexing (OFDM) signal by using the pilot signals contained in the OFDM signal, and filtering the pre-interpolation transmission path characteristic data by using an interpolation filter, thereby obtaining transmission path characteristic data as estimate values for transmission path characteristics for transmission symbols of the OFDM signal by a transmission path characteristics estimating section;
carrying out distortion correction for the OFDM signal by using the transmission path characteristic data by a distortion correcting section; and
controlling a pass band of the interpolation filter by a filter controlling section, wherein
the OFDM signal contains therein a preamble symbol in which transmission symbols of a preamble signal and transmission symbols of a pilot signal are arranged in positions previously determined, respectively,
the filtering the pre-interpolation transmission path characteristic data includes filtering the pre-interpolation transmission path characteristic data as the estimate values of the transmission path characteristics for transmission symbols of the pilot signal contained in the preamble symbol obtained by using the transmission symbol of the pilot signal contained in the preamble symbol by using said interpolation filter while the pass band is adjusted, thereby obtaining the transmission path characteristic data as the estimate values of the transmission path characteristics for the transmission symbols of the OFDM signal,
the carrying out distortion correction for the OFDM signal includes carrying out the distortion correction for transmission symbols of the preamble symbol by using the transmission path characteristic data, the controlling the pass band of the interpolation filter further includes:
obtaining a signal quality of the transmission symbols of the preamble signal after completion of the distortion correction; and
obtaining the pass band in which the signal quality is made best,
the OFDM signal further contains therein data symbols in which transmission symbols of data are arranged, and the transmission symbols of the pilot signal are arranged with the data in accordance with one of plural pilot patterns previously determined,
the preamble signal contains therein information on a pilot pattern of the data symbols, and
the controlling the pass band of the interpolation filter further includes:
controlling the pass band by using the transmission symbols of the preamble symbol so that a signal quality of the OFDM signal after completion of the distortion correction is made best before the information on the pilot pattern of the data symbols contained in the preamble signal is acquired; and
controlling the pass band by using the transmission symbols of the data symbols so that the signal quality of the OFDM signal after completion of the distortion correction is made best after the information on the pilot pattern of the data symbols contained in the preamble signal is acquired.

7. A receiving system, comprising:
circuitry configured to:
subject a signal acquired through a transmission path to transmission path decoding processing including at least processing for correcting an error caused in said transmission path; and
subject the signal subjected to the transmission path decoding processing to information source decoding processing including at least processing for expanding compressed information to original information, wherein
the signal acquired through said transmission path is an Orthogonal Frequency Division Multiplexing (OFDM) signal containing therein a preamble symbol in which a transmission symbols of a preamble signal and transmission symbols of a pilot signal are arranged in positions previously determined, respectively,
the circuitry is further configured to:
obtain pre-interpolation transmission path characteristic data as estimate values for transmission path characteristics as characteristics of said transmission path for transmission symbols of pilot signals of the OFDM signal by using the pilot signals contained in the OFDM signal, and filter the pre-interpolation transmission path characteristic data by using an interpolation filter, thereby obtaining transmission path characteristic data as estimate values for transmission path characteristics for transmission symbols of the OFDM signal,
carry out distortion correction for the OFDM signal by using the transmission path characteristic data, and
control a pass band of said interpolation filter
to filter the pre-interpolation transmission characteristic data, the circuitry is further configured to filter the pre-interpolation transmission path characteristic data as the estimate values of the transmission path characteristics for transmission symbols of the pilot signal contained in the preamble symbol obtained by using the transmission symbols of the pilot signal contained in the preamble symbol by using said interpolation filter while the pass band is adjusted, thereby obtaining the transmission path characteristic data as the estimate values of the transmission path characteristics for the transmission symbols of the OFDM signal,
to carry out the distortion correction for the OFDM signal, the circuitry is further configured to carry out the distortion correction for transmission symbols of the preamble symbol by using the transmission path characteristic data,
the circuitry is further configured to:
obtain a signal quality of the transmission symbols of the preamble signal after completion of the distortion correction, and
obtain the pass band in which the signal quality is made best,
the OFDM signal further contains therein data symbols in which transmission symbols of data are arranged, and the transmission symbols of the pilot signal are arranged with the data in accordance with one of plural pilot patterns previously determined,
the preamble signal contains therein information on a pilot pattern of the data symbols, and
to control the pass band of said interpolation filter, the circuitry is further configured to:
control the pass band by using the transmission symbols of the preamble symbol so that a signal quality of the OFDM signal after completion of the distortion correction is made best before the information on the pilot pattern of the data symbols contained in the preamble signal is acquired, and
control the pass band by using the transmission symbols of the data symbols so that the signal quality of the OFDM signal after completion of the distortion correction is made best after the information on the pilot pattern of the data symbols contained in the preamble signal is acquired.

8. A receiving system, comprising:
circuitry configured to:
subject a signal acquired through a transmission path to transmission path decoding processing including at least processing for correcting an error caused in said transmission path; and
output an image or a sound in accordance with the signal subjected to the transmission path decoding processing, wherein
the signal acquired through said transmission path is an Orthogonal Frequency Division Multiplexing (OFDM) signal containing therein a preamble symbol in which a transmission symbols of a preamble signal and transmission symbols of a pilot signal are arranged in positions previously determined, respectively,
the circuitry is further configured to:
obtain pre-interpolation transmission path characteristic data as estimate values for transmission path characteristics as characteristics of said transmission path for transmission symbols of pilot signals of the OFDM signal by using the pilot signals contained in the OFDM signal, and filter the pre-interpolation transmission path characteristic data by using an interpolation filter, thereby obtaining transmission path characteristic data as estimate values for transmission path characteristics for transmission symbols of the OFDM signal,
carry out distortion correction for the OFDM signal by using the transmission path characteristic data, and
control a pass band of the interpolation filter, to filter the pre-interpolation transmission characteristic data, the circuitry is further configured to filter the pre-interpolation transmission path characteristic data as the estimate values of the transmission path characteristics for transmission symbols of the pilot signal contained in the preamble symbol obtained by using the transmission symbols of the pilot signal contained in the preamble symbol by using said interpolation filter while the pass band is adjusted, thereby obtaining the transmission path characteristic data as the estimate values of the transmission path characteristics for the transmission symbols of the OFDM signal, to carry out the distortion correction for the ODFM signal, the circuitry is further configured to carry out the distortion correction for transmission symbols of the preamble symbol by using the transmission path characteristic data, the circuitry is further configured to:
  obtain a signal quality of the transmission symbols of the preamble signal after completion of the distortion correction, and
  obtain the pass band in which the signal quality is made best, the OFDM signal further contains therein data symbols in which transmission symbols of data are arranged, and the transmission symbols of the pilot signal are arranged with the data in accordance with one of plural pilot patterns previously determined, the preamble signal contains therein information on a pilot pattern of the data symbols, and to control the pass band of said interpolation filter, the circuitry is further configured to:
  control the pass band by using the transmission symbols of the preamble symbol so that a signal quality of the OFDM signal after completion of the distortion correction is made best before the information on the pilot pattern of the data symbols contained in the preamble signal is acquired, and
  control the pass band by using the transmission symbols of the data symbols so that the signal quality of the OFDM signal after completion of the distortion correction is made best after the information on the pilot pattern of the data symbols contained in the preamble signal is acquired.

9. A recording system, comprising:

circuitry configured to:
  subject a signal acquired through a transmission path to transmission path decoding processing including at least processing for correcting an error caused in said transmission path; and
  record the signal subjected to the transmission path decoding processing, wherein the signal acquired through said transmission path is an Orthogonal Frequency Division Multiplexing (OFDM) signal containing therein a preamble symbol in which transmission signals of a preamble signal and transmission symbols of a pilot signal are arranged in positions previously determined, respectively, the circuitry is further configured to:
  obtain pre-interpolation transmission path characteristic data as estimate values for transmission path characteristics as characteristics of said transmission path for transmission symbols of pilot signals of the OFDM signal by using the pilot signals contained in the OFDM signal, and filter the pre-interpolation transmission path characteristic data by using an interpolation filter, thereby obtaining transmission path characteristic data as estimate values for transmission path characteristics for transmission symbols of the OFDM signal,
  carry out distortion correction for the OFDM signal by using the transmission path characteristic data, and control a pass band of the interpolation filter, to filer the pre-interpolation transmission characteristic data, the circuitry is further configured to filter the pre-interpolation transmission path characteristic data as the estimate values of the transmission path characteristics for transmission symbols of the pilot signal contained in the preamble symbol obtained by using the transmission symbols of the pilot signal contained in the preamble symbol by using said interpolation filter while the pass band is adjusted, thereby obtaining the transmission path characteristic data as the estimate values of the transmission path characteristics for the transmission symbols of the OFDM signal, to carry out the distortion correction for the OFDM signal, the circuitry is further configured to carry out the distortion correction for transmission symbols of the preamble symbol by using the transmission path characteristic data, the circuitry is further configured to:
  obtain a signal quality of the transmission symbols of the preamble signal after completion of the distortion correction, and
  obtain the pass band in which the signal quality is made best, the OFDM signal further contains therein data symbols in which transmission symbols of data are arranged, and the transmission symbols of the pilot signal are arranged with the data in accordance with one of plural pilot patterns previously determined, the preamble signal contains therein information on a pilot pattern of the data symbols, and to control the pass band of said interpolation filter, the circuitry is further configured to:
  control the pass band by using the transmission symbols of the preamble symbol so that a signal quality of the OFDM signal after completion of the distortion correction is made best before the information on the pilot pattern of the data symbols contained in the preamble signal is acquired, and
  control the pass band by using the transmission symbols of the data symbols so that the signal quality of the OFDM signal after completion of the distortion correction is made best after the information on the pilot pattern of the data symbols contained in the preamble signal is acquired.

10. A receiving system, comprising:

circuitry configured to
  acquire a signal through a transmission path; and
  subject the signal acquired through said transmission path to transmission path decoding processing including at least processing for correcting an error caused in said transmission path, wherein the signal acquired through said transmission path is an Orthogonal Frequency Division Multiplexing (OFDM) signal containing therein a preamble symbol in which transmission symbols of a preamble signal and transmission symbols of a pilot signal are arranged in positions previously determined, respectively, the circuitry is further configured to:
  obtain pre-interpolation transmission path characteristic data as estimate values for transmission path characteristics as characteristics of said transmission path for transmission symbols of pilot signals of the OFDM signal by using the pilot signals contained in the OFDM signal, and filter the pre-interpolation transmission path characteristic data by using an interpolation filter, thereby obtaining transmission path characteristic data as estimate values for transmission path characteristics for transmission symbols of the OFDM signal, carry out distortion correction for the OFDM signal by using the transmission path characteristic data, and control a pass band of said interpolation filter, to filter the pre-interpolation transmission characteristic data, the circuitry is further configured to filter the pre-interpolation transmission path characteristic data as the estimate values of the transmission path characteristics for transmission symbols of the pilot signal contained in the preamble symbol obtained by using the transmission symbols of the pilot signal contained in the preamble symbol by using said interpolation filter while the pass band is adjusted, thereby obtaining the transmission path characteristic data as the estimate values of the transmission path characteristics for the transmission symbols of the OFDM signal, to carry out the distortion correction for the OFDM signal, the circuitry is further configured to carry out the distortion correction for transmission symbols of the preamble symbol by using the transmission path characteristic data, the circuitry is further configured to:
  obtain a signal quality of the transmission symbols of the preamble signal after completion of the distortion correction, and
  obtain the pass band in which the signal quality is made best, the OFDM signal further contains therein data symbols in which transmission symbols of data are arranged, and the transmission symbols of the pilot signal are arranged with the data in accordance with one of plural pilot patterns previously determined, the preamble signal contains therein information on a pilot pattern of the data symbols, and the circuitry is further configured to:
  control the pass band by using the transmission symbols of the preamble symbol so that a signal quality of the OFDM signal after completion of the distortion correction is made best before the information on the pilot pattern of the data symbols contained in the preamble signal is acquired, and
  control the pass band by using the transmission symbols of the data symbols so that the signal quality of the OFDM signal after completion of the distortion correction is made best after the information on the pilot pattern of the data symbols contained in the preamble signal is acquired.

* * * * *